(12) United States Patent
Yang et al.

(10) Patent No.: US 9,014,173 B2
(45) Date of Patent: Apr. 21, 2015

(54) METHOD AND APPARATUS FOR TRANSMITTING CONTROL INFORMATION

(71) Applicant: LG Electronics Inc., Seoul (KR)

(72) Inventors: Suckchel Yang, Anyang-si (KR);
Joonkui Ahn, Anyang-si (KR);
Dongyoun Seo, Anyang-si (KR);
Mingyu Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/915,386

(22) Filed: Jun. 11, 2013

(65) Prior Publication Data
US 2013/0272172 A1 Oct. 17, 2013

Related U.S. Application Data

(63) Continuation of application No. 13/513,115, filed as application No. PCT/KR2011/008144 on Oct. 28, 2011, now Pat. No. 8,472,471.

(60) Provisional application No. 61/407,885, filed on Oct.
(Continued)

(51) Int. Cl.
H04J 3/06 (2006.01)
H04W 72/04 (2009.01)
(Continued)

(52) U.S. Cl.
CPC ......... *H04W 72/0413* (2013.01); *H04L 1/1671* (2013.01); *H04L 1/1854* (2013.01);
(Continued)

(58) Field of Classification Search
CPC ..... H04L 5/0055; H04L 5/001; H04L 5/0053; H04L 1/1861; H04W 72/0413; H04W 72/0406; H04W 72/042; H04W 72/04

USPC ................................. 370/310–350
See application file for complete search history.

(56) References Cited

U.S. PATENT DOCUMENTS 5,966,375 A 10/1999 Kagaya
7,609,752 B2 10/2009 Fujii et al.
(Continued)

FOREIGN PATENT DOCUMENTS

RU 2251220 C2 4/2005

OTHER PUBLICATIONS

Huawei, Hisilicon, "Simultaneous Transmission of CQI and ACK/NACK," Agenda Item 6.2.1.3, 3GPP TSG RAN WG1 Meeting #62bis, R1-105123, Oct. 11-15, 2010, Xi'an, China, 6 pages.
(Continued)

Primary Examiner — Fan Ng
(74) Attorney, Agent, or Firm — Birch, Stewart, Kolasch & Birch, LLP

(57) ABSTRACT

The present invention relates to a wireless communication system. More particularly, the present invention relates to a method and apparatus for transmitting uplink control information in the event that a plurality of cells is constructed, wherein the method comprises the following steps: receiving a PDCCH and/or a PDSCH; generating acknowledgement information on the PDCCH and/or PDSCH; and, if acknowledgement information transmission timing and channel state information transmission timing collide with each other, dropping the channel state information and transmitting only the acknowledgement information, or transmitting the acknowledgement information, or transmitting the acknowledgement information and the channel state information together in accordance with a predetermined condition.

16 Claims, 18 Drawing Sheets

Related U.S. Application Data 28, 2010, provisional application No. 61/436,594, filed on Jan. 26, 2011, provisional application No. 61/445,978, filed on Feb. 23, 2011, provisional application No. 61/486,763, filed on May 16, 2011.

(51) Int. Cl.
*H04L 1/16* (2006.01)
*H04L 1/18* (2006.01)
*H04L 5/00* (2006.01)
*H04W 72/12* (2009.01)

(52) U.S. Cl.
CPC ............ *H04L 5/001* (2013.01); *H04L 5/0053* (2013.01); *H04L 5/0055* (2013.01); *H04L 5/0048* (2013.01); *H04W 72/1268* (2013.01)

(56) References Cited

U.S. PATENT DOCUMENTS

| 8,050,227 | B2* | 11/2011 | Lee et al. ................. 370/329 |
| 8,472,471 | B2* | 6/2013 | Yang et al. ................ 370/464 |
| 2008/0310459 | A1 | 12/2008 | Date |
| 2009/0316626 | A1 | 12/2009 | Lee et al. |
| 2010/0165873 | A1 | 7/2010 | Higuchi et al. |
| 2012/0039285 | A1* | 2/2012 | Seo et al. ................. 370/329 |
| 2012/0087254 | A1* | 4/2012 | Yin et al. ................. 370/252 |
| 2012/0113944 | A1* | 5/2012 | Yang et al. ................ 370/329 |
| 2012/0320805 | A1* | 12/2012 | Yang et al. ................ 370/280 |
| 2013/0044653 | A1* | 2/2013 | Yang et al. ................ 370/280 |
| 2013/0094410 | A1* | 4/2013 | Yang et al. ................ 370/280 |
| 2013/0272172 | A1* | 10/2013 | Yang et al. ................ 370/280 |

OTHER PUBLICATIONS

Huawei, Hisilicon, "Simultaneous Transmission of Uplink Channels or Signals," Agenda Item 6.2.4, 3GPP TSG RAN WG1 Meeting #62bis, R1-105129, Oct. 11-15, 2010, Xi'an, China, 5 pages.

LG Electronics, "ACK/NACK on PUCCH for TDD," Agenda Item 6.2.1.1, G3PP TSG RAN WG1 Meeting #62bis, R1-105647, Oct. 11-15, 2010, Xian, China, pp. 1-7.

LG Electronics, "UCI Combination on PUCCH for CA," Agenda Item 6.2.1.3, 3GPP TSG RAN WG1 #62bis, R1-105649, Oct. 11-15, 2010, Xian, China, pp. 1-13.

3rd Generation Partnership Project, Technical Specification Group Radio Access Network, "Evolved Universal Terrestrial Radio Access (E-UTRA)," Physical layer procedures (Release 9), 3GPP TS 36.213 V9.3.0, Sep. 2010, 80 pages.

* cited by examiner

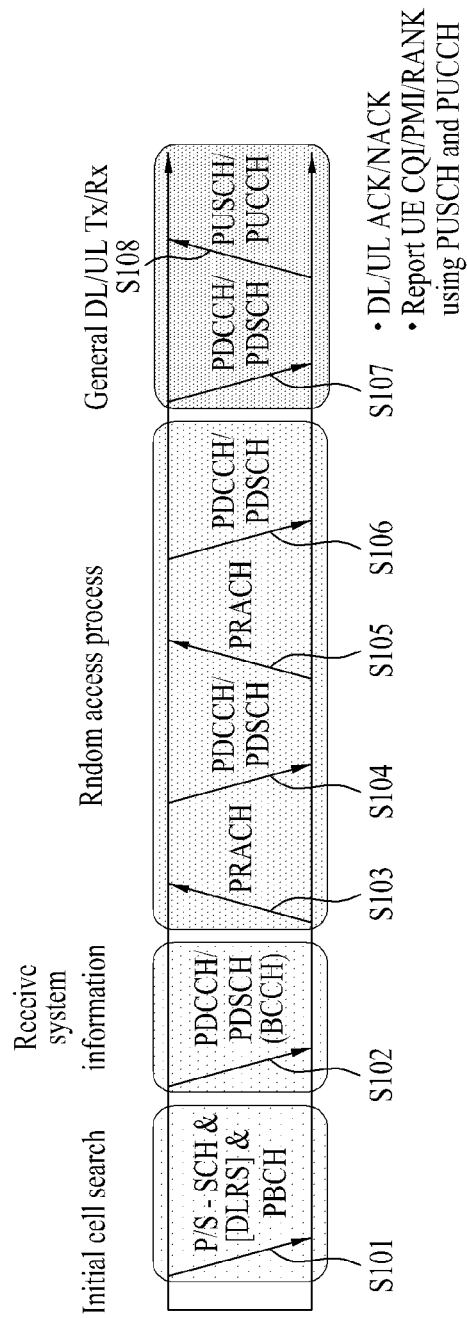

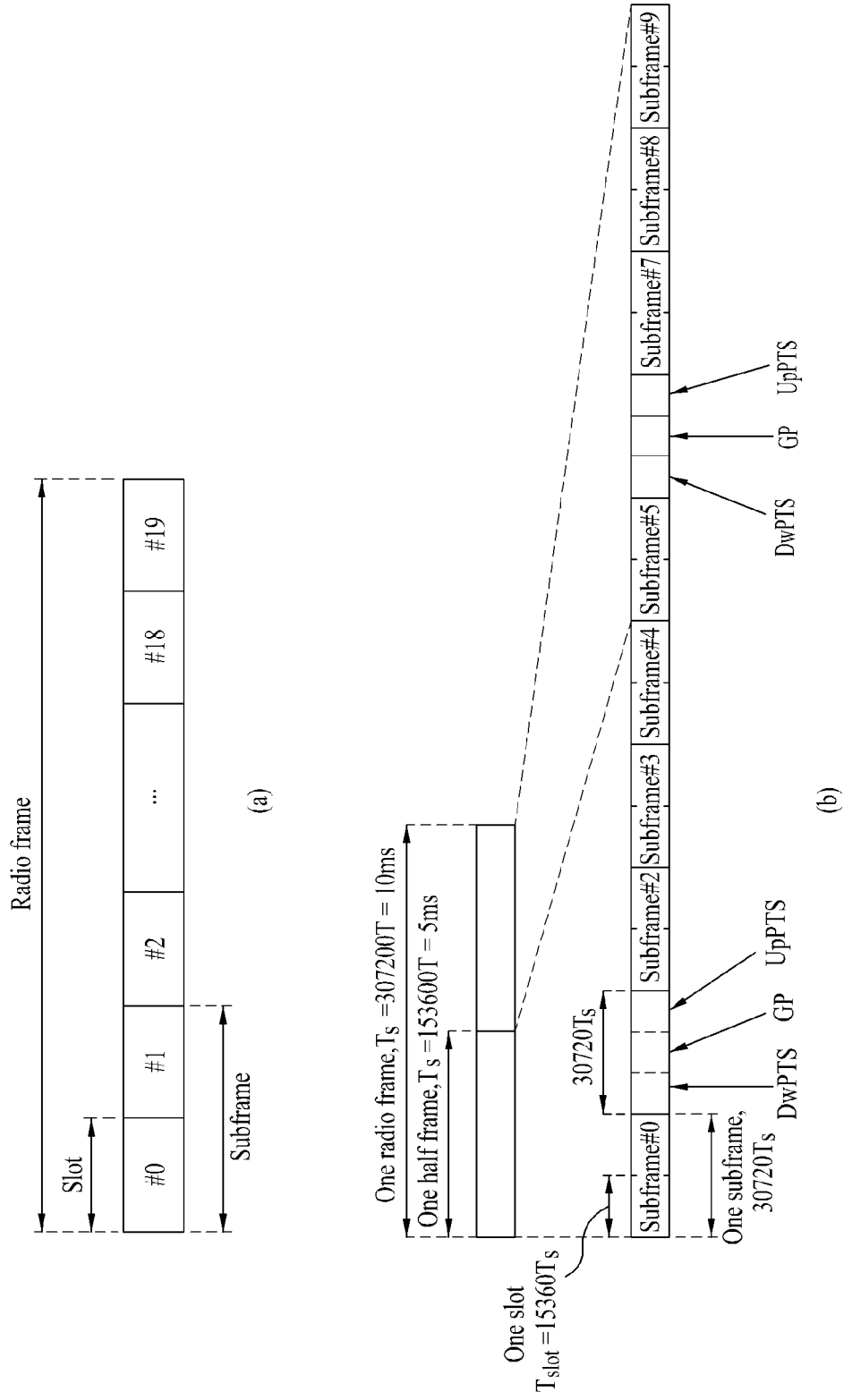

Reuse of LTE PUCCH format 2 (normal CP case)

METHOD AND APPARATUS FOR TRANSMITTING CONTROL INFORMATION

CROSS REFERENCE TO RELATED APPLICATIONS

This application is a Continuation of co-pending application Ser. No. 13/513,115 filed on Sep. 12, 2012, which is the national phase of PCT International Application No. PCT/KR2011/008144 filed on Oct. 28, 2011, and which claims priority to U.S. Provisional Application Nos. 61/407,885 filed on Oct. 28, 2010, 61/436,594 filed on Jan. 26, 2011, 61/445,978 filed on Feb. 23, 2011, and 61/486,763 filed on May 16, 2011. The entire contents of all of the above applications are hereby incorporated by reference.

TECHNICAL FIELD

The present invention relates to a wireless communication system, and more particularly, to a method and apparatus for transmitting control information.

BACKGROUND ART

Wireless communication systems have been widely deployed to provide various types of communication services including voice and data services. In general, a wireless communication system is a multiple access system that supports communication of multiple users by sharing available system resources (e.g. a bandwidth, transmission power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention is to provide a method and apparatus for efficiently transmitting control information in a wireless communication system.

Another object of the present invention is to provide a method and apparatus for efficiently transmitting multiple uplink control information and efficiently managing resources for the uplink control information transmission when the multiple uplink control information need to be transmitted in the same subframe.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

According to an aspect of the present invention, the objects of the present invention can be achieved by providing a method of transmitting uplink control information at a communication apparatus in a time division duplex (TDD) wireless communication system, the method comprising: receiving at least one of one or more physical downlink control channels (PDCCHs) and one or more physical downlink shared channels (PDSCHs); and generating reception response information about the at least one of the one or more PDCCHs and the one or more PDSCHs, wherein when a transmission time of the reception response information and a transmission time of channel status information collide, if a certain condition is satisfied, the reception response information and the channel status information are transmitted together using a first physical uplink control channel (PUCCH) format, wherein when the transmission time of the reception response information and the transmission time of the channel status information collide, if the certain condition is not satisfied, the reception response information is transmitted using a second PUCCH format and the channel status information is dropped, wherein the certain condition includes at least one of the following conditions (1) to (3):
  (1) a single PDSCH transmission only on a primary cell (PCell) indicated by detection of a PDCCH having a downlink assignment index (DAI) initial value is present;
  (2) a single PDCCH transmission only on the PCell that has the DAI initial value and indicates a semi-persistent scheduling (SPS) release is present; and
  (3) a single PDSCH transmission only on the PCell where there is not a corresponding PDCCH is present.

According to another aspect of the present invention, the objects of the present invention can be achieved by providing a communication apparatus configured to transmit uplink control information in a Time Division Duplex (TDD) wireless communication system, the communication apparatus comprising: a Radio Frequency (RF) unit; and a processor configured to receive at least one of one or more Physical Downlink Control CHannels (PDCCHs) and one or more Physical Downlink Shared CHannels (PDSCHs), and to generate reception response information about the at least one of the one or more PDCCHs and the one or more PDSCHs, wherein when a transmission time of the reception response information and a transmission time of channel status information collide, if a certain condition is satisfied, the reception response information and the channel status information are transmitted together using a first Physical Uplink Control CHannel (PUCCH) format, wherein when the transmission time of the reception response information and the transmission time of the channel status information collide, if the certain condition is not satisfied, the reception response information is transmitted using a second PUCCH format and the channel status information is dropped, wherein the certain condition includes at least one of the following conditions (1) to (3):
  (1) a single PDSCH transmission only on a Primary Cell (PCell) indicated by detection of a PDCCH having a Downlink Assignment Index (DAI) initial value is present;
  (2) a single PDCCH transmission only on the PCell that has the DAI initial value and indicates a Semi-Persistent Scheduling (SPS) release is present; and
  (3) a single PDSCH transmission only on the PCell where there is not a corresponding PDCCH is present.

If the certain condition is not satisfied, resource for the second PUCCH format may be indicated by a value of Transmit Power Control (TPC) field of one or more Secondary Cell (SCell) PDCCH and/or one or more PCell PDCCH not corresponding to the DAI initial value.

The at least one of one or more PDCCHs and one or more PDSCHs may be received in a subframe n−k (k∈K), the reception response information may be transmitted in a subframe n, and K may be given by the below table in accordance with UL-DL configuration.

| UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The DAI initial value may be 1.

The first PUCCH format may be a PUCCH format 2, 2a or 2b.

The second PUCCH format may be a PUCCH format 3.

Advantageous Effects

According to embodiments of the present invention, it is possible to efficiently transmit control information in a wireless communication system. Specifically, when multiple pieces of uplink control information need to be transmitted in the same subframe, the uplink control information can be efficiently transmitted and resources for the uplink control information transmission can be efficiently managed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 illustrates physical channels and signal transmission on the physical channels in a 3GPP LTE system;

FIG. 2A illustrates an exemplary radio frame structure;

FIG. 11 illustrates cross-carrier scheduling;

BEST MODEL

Figure 2B:
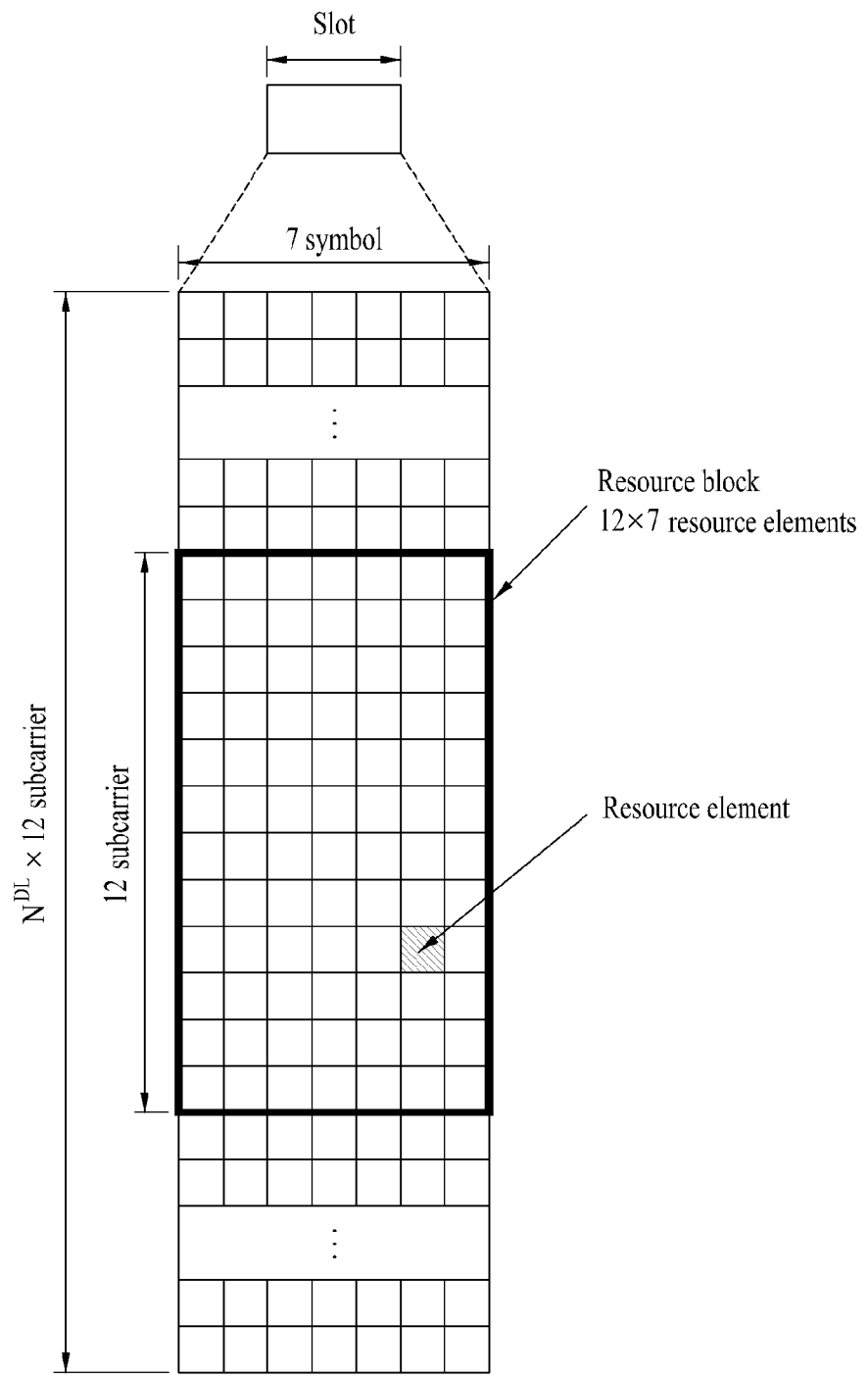
FIG. 2B illustrates an exemplary resource grid of a downlink slot.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LIE.

While the following description is given, centering on 3GPP LTE/LTE-A to clarify the description, this is purely exemplary and thus should not be construed as limiting the present invention.

In a wireless communication system, a user equipment (UE) receives information from a base station (BS) through a downlink (DL) and transmits information to the BS through an uplink (UL). Information transmitted/received between the UE and the BS includes data and control information, and various physical channels exist according to type/purpose of the information.

FIG. 1 illustrates physical channels and signal transmission on the physical channels in a 3GPP LTE system.

Referring to FIG. 1, when a UE is powered on or enters a new cell, the UE performs an initial cell search involving acquisition of synchronization with a BS in step S101. For the initial cell search, the UE receives a Primary Synchronization CHannel (P-SCH) and a Secondary Synchronization CHannel (S-SCH) from the BS, and acquires synchronization with the BS and information such as a cell Identity (ID) from the P-SCH and the S-SCH. Then the UE may receive a Physical Broadcast CHannel (PBCH) from the BS and acquire broadcast information within a cell from the PBCH. The UE may check a downlink channel state by receiving a downlink reference signal (DL RS) in the initial cell search step.

Upon completion of the initial cell search, the UE may acquire more specific system information by receiving a Physical Downlink Control CHannel (PDCCH) and receiving a Physical Downlink Shared CHannel (PDSCH) according to information carried on the PDCCH in step S102.

Subsequently, the UE may perform a random access procedure (S103 to S106) in order to complete access to the BS. For the random access procedure, the UE may transmit a preamble on a Physical Random Access CHannel (PRACH) (S103) and receive a response message to the preamble on a PDSCH (S104). If the random access procedure is contention-based, the UE may additionally perform a contention resolution procedure such as transmission of an additional PRACH (S105) and reception of a PDCCH and a PDSCH corresponding to the PDCCH (S106).

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). In the specification, the HARQ ACK/NACK is simply referred to as a HARQ-ACK or ACK/NACK (A/N). The HARQ-ACK includes at least one of a positive ACK (simply, ACK), a negative ACK (NACK), DTX and NACK/DTX. The UCI is transmitted on a PUCCH, in general. However, the UCI can be transmitted on a PUSCH when control information and traffic data need to be transmitted simultaneously. Furthermore, the UCI can be non-periodically transmitted on a PUSCH at the request/instruction of a network.

FIG. 2A illustrates a radio frame structure. In a cellular OFDM wireless packet communication system, UL/DL data packet transmission is performed based on subframe. One subframe is defined as a predetermined interval including a plurality of OFDM symbols. 3GPP LTE standard supports type-1 radio frame applicable to Frequency Division Duplex (FDD) and type-2 radio frame applicable to Time Division Duplex (TDD).

FIG. 2A (a) illustrates a type-1 radio frame structure. A DL radio frame includes 10 subframes each having 2 slots in the time domain. A time required to transit one subframe is referred to as Transmission Time Interval (TTI). For example, one subframe is 1 ms long and one slot is 0.5 ms long. One slot includes a plurality of OFDM symbols in the time domain and a plurality of Resource Blocks (RBs) in the frequency domain. Since 3GPP LTE systems use OFDMA on a downlink, an OFDM symbol represents one symbol interval. The OFDM symbol can be called a SC-FDMA symbol or symbol interval. A RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2A (b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

FIG. 2B illustrates a resource grid of a DL slot.

Referring to FIG. 2B, a DL slot includes a plurality of OFDM symbols in the time domain. One DL slot may include 7 (6) OFDM symbols, and a Resource Block (RB) may include 12 subcarriers in the frequency domain. Each element on the resource grid is referred to as a Resource Element (RE). One RB includes 12×7 (6) REs. The number of RBs in a DL slot, $N_{RB}$, depends on a DL transmission band. A UL slot has the same structure as the DL slot and includes SC-FDMA symbols instead of OFDM symbols.

Figure 3:
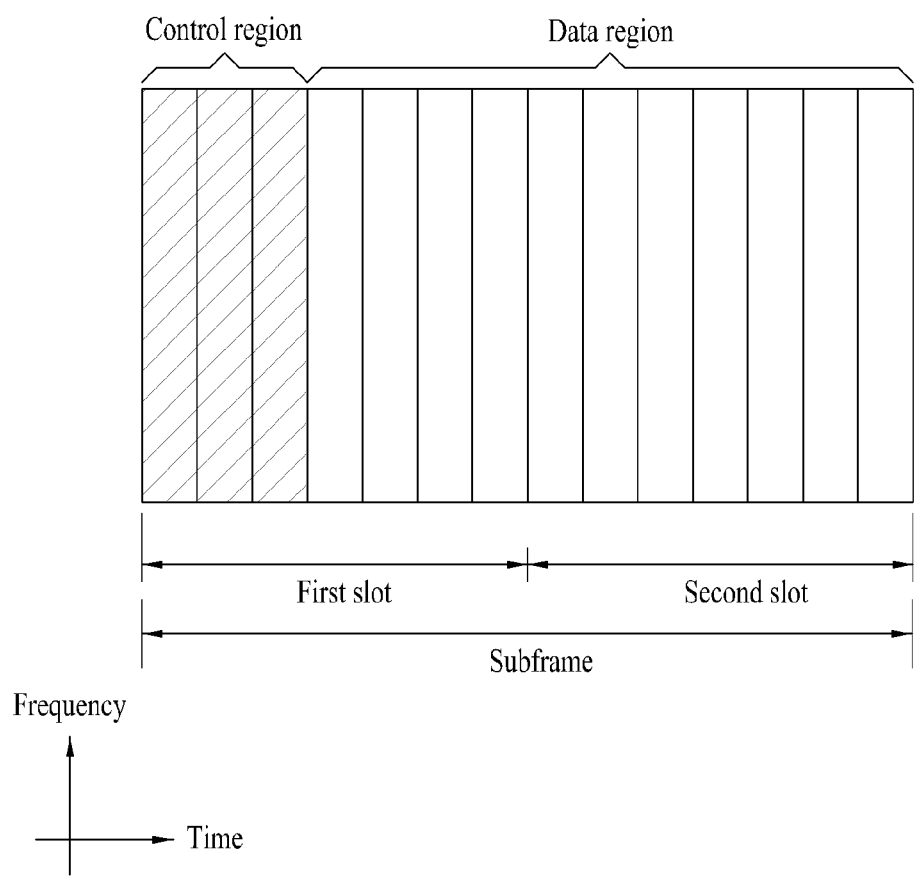
FIG. 3 illustrates an exemplary downlink subframe structure.

FIG. 3 illustrates a downlink subframe structure.

Referring to FIG. 3, the first three or four OFDM symbols in the first slot of a subframe correspond to a control region to which a control channel is allocated and the remaining OFDM symbols correspond to a data region to which a PDSCH is allocated. Examples of a DL control channel used in an LTE system include a Physical Control Format Indicator CHannel (PCFICH), a Physical Downlink Control Channel (PDCCH), a Physical Hybrid ARQ Indicator Channel (PHICH), etc. The PCFICH is transmitted through the first OFDM symbol of a subframe and carries information on the number of OFDM symbols used for control channel transmission in the subframe. The PHICH carries a Hybrid Automatic Repeat reQuest ACK/NACK (HARQ ACK/NACK) signal in response to uplink transmission.

Control information transmitted on the PDCCH is referred to as Downlink Control Information (DCI). The DCI includes resource allocation information and control information for a UE or a UE group. For example, the DCI includes UL/DL scheduling information, a UL transmission (Tx) power control command, etc.

The PDCCH carries transport format and resource allocation information of a Downlink Shared CHannel (DL-SCH), transport format and resource allocation information of an Uplink Shared Channel (UL-SCH), paging information on a Paging CHannel (PCH), system information on the DL-SCH, resource allocation information of a higher-layer control message, such as a random access response transmitted on a PDSCH, a Tx power control command set with respect to individual UEs in a UE group, a Tx power control command, enabling information of Voice over IP (VoIP), etc. A plurality of PDCCHs can be transmitted in the control region. A GE can monitor the plurality of PDCCHs. The PDCCH is transmitted on aggregation of one or more consecutive Control Channel Elements (CCEs). A CCE is a logical allocation unit used to provide a coding rate based on a radio channel state to the PDCCH. The CCE corresponds to a plurality of Resource Element Groups (REGs). The format of the PDCCH and the number of bits of the PDCCH are determined on the basis of the number of CCEs. A BS determines a PDCCH format according to DCI to be transmitted to a UE and adds Cyclic Redundancy Check (CRC) to control information. The CRC is masked by an identifier (e.g. Radio Network Temporary Identifier (RNTI)) according to the owner or purpose of the PDCCH. For example, when the PDCCH is destined for a specific UE, the CRC can be masked by the identifier (e.g. cell-RNTI (C-RNTI)) of the specific UE. When the PDCCH is for a paging message, the CRC can be masked by a paging identifier (e.g. paging-RNTI (P-RNTI)). When the PDCCH is for system information (more specifically, a System Information Block (SIC)), the CRC can be masked by a System Information RNTI (SI-RNTI). When the PDCCH is for a random access response, the CRC can be masked by a Random Access RNTI (RA-RNTI).

Figure 4:
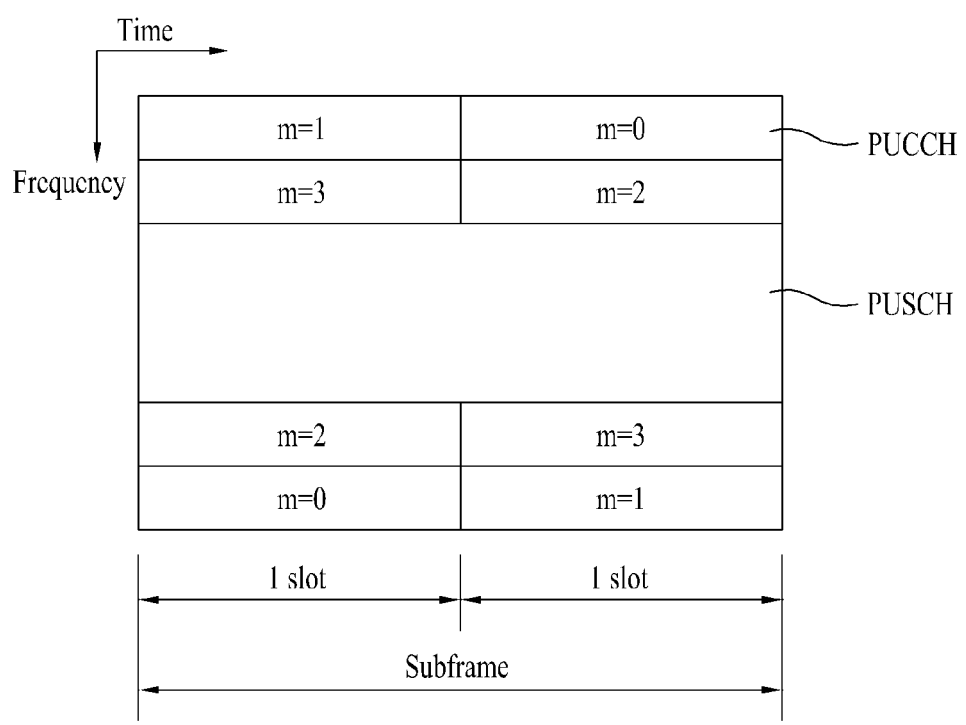
FIG. 4 illustrates an exemplary uplink subframe structure.

FIG. 4 illustrates an uplink subframe structure used in an LTE system.

Referring to FIG. 4, an uplink subframe includes a plurality of slots (e.g. two slots). The slots may include different numbers of SC-FDMA symbols according to CP length. The uplink subframe is divided into a data region and a control region in the frequency domain. The data region includes a PUCCH and is used to transmit a data signal such as audio data. The control region includes a PUCCH and is used to transmit UCI. The PUCCH includes RB pairs located on both ends of the data region in the frequency domain and is hopped based on slots.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI), Precoding Matrix Indicator (PMI), Precoding Type Indicator (PTI), etc. 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in an LTE system.

TABLE 1

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

An SRS is transmitted through the last symbol in one subframe in the time domain. SRSs of multiple UEs, which are transmitted through the last symbol of the same subframe, can be identified according to frequency position/sequence. In LTE, an SRS is periodically transmitted. Configuration for periodic SRS transmission is achieved by a cell-specific SRS parameter and a UE-specific SRS parameter. The cell-specific SRS parameter (in other words, cell-specific SRS configuration) and the UE-specific SRS parameter (in other words, UE-specific SRS configuration) are transmitted to a UE through higher layer (e.g. RRC) signaling.

The cell-specific SRS parameter includes srs-BandwidthConfig and srs-SubframeConfig. Here, srs-BandwidthConfig indicates information about a frequency bandwidth in which an SRS can be transmitted in a cell and srs-SubframeConfig indicates information about a subframe in which the SRS can be transmitted in the cell. The subframe in which the SRS can be transmitted in the cell is periodically set. The UE-specific SRS parameter includes srs-Bandwidth, srs-HoppingBandwidth, freqDomainPosition, srs-ConfigIndex, transmissionComb and cyclicShift. Here, srs-Bandwidth represents a value used to set a frequency bandwidth in which the corresponding UE transmits the SRS and srs-HoppingBandwidth indicates a value used to set frequency hopping of the SRS. FreqDomainPosition represents a value used to determine a frequency position in which the SRS is transmitted and srs-ConfigIndex indicates a value used to set a subframe in which the corresponding UE transmits the SRS. In addition, transmissionComb denotes a value used to set SRS transmission comb and cyclicShift represents a value used to set a cyclic shift value applied to an SRS sequence.

Figure 5:
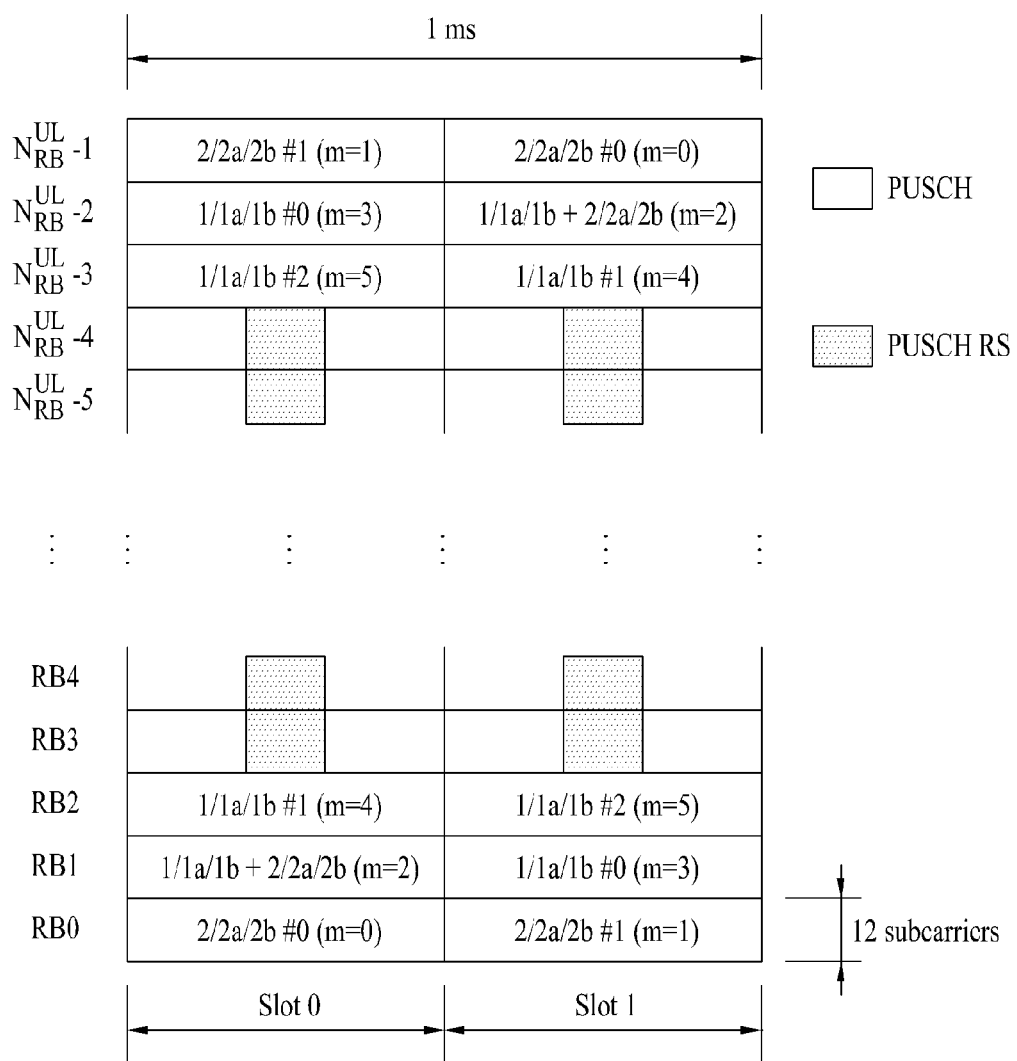
FIG. 5 illustrates an example of physically mapping a PUCCH format to a PUCCH region.

FIG. 5 illustrates an example of physically mapping a PUCCH format to a PUCCH region.

Referring to FIG. 5, PUCCH formats are mapped onto RBs in the order of PUCCH formats 2/2a/2b (CQI) (e.g. PUCCH regions m=0, 1), PUCCH formats 2/2a/2b (CQI) or PUCCH formats 1/1a/1b (SR/HARQ ACK/NACK) (e.g. PUCCH region m=2 if present), and PUCCH formats 1/1a/1b (SR/HARQ ACK/NACK) (e.g. PUCCH regions m=3, 4, 5), starting from the band-edge, and transmitted. The number of PUCCH RBs, $N_{RB}^{(2)}$, which can be used for PUCCH formats 2/2a/2b (CQI) is signaled to a UE in a cell through broadcast signaling.

Figure 6:
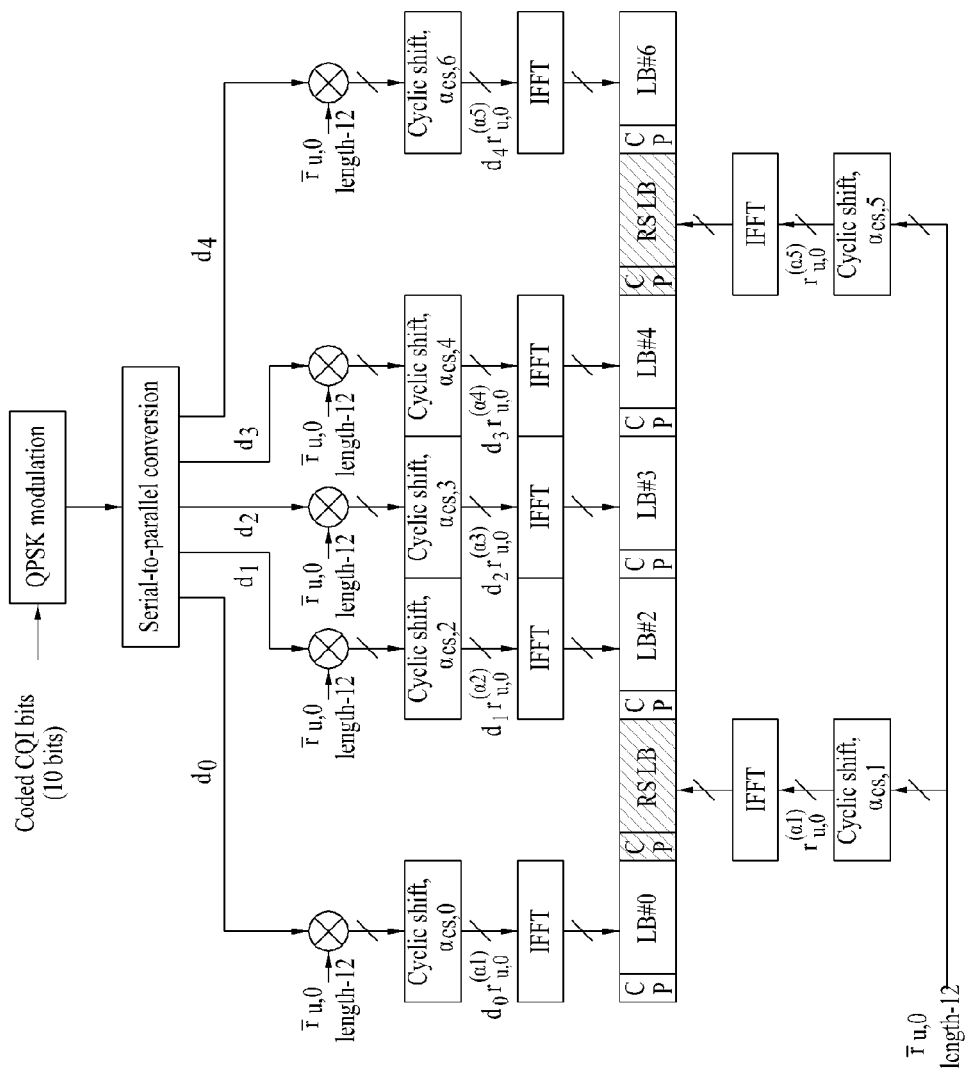
FIG. 6 illustrates a slot level structure of PUCCH format 2/2a/2b.

FIG. 6 illustrates a slot level structure of PUCCH formats 2/2a/2b. The PUCCH formats 2/2a/2b are used for CSI transmission. CSI includes CQI, PMI, RI, etc. In the case of normal CP, SC-FDMA symbols #1 and #5 in a slot are used for transmission of a Demodulation Reference Signal (DM RS). In the case of extended CP, only SC-FDMA #3 in the slot is used for DM RS transmission.

Referring to FIG. 6, at a subframe level, 10-bit CSI is channel-coded into 20 coded bits using (20, k) Reed-Muller code punctured at a rate of 1/2 (not shown). The coded bits are scrambled (not shown) and then mapped to Quadrature Phase Shift Keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Each of the QPSK modulation symbols is used to modulate a lengh-12 base RS sequence $r_{u,0}$ prior to being subjected to Inverse Fast Fourier Transform (IFFT). Consequently, the RS sequence is cyclic-shifted in the time domain according to the QPSK modulation symbol value ($d_x * r_{u,0}^{(\alpha x)}$, x=0 to 4). The RS sequence multiplied by the QPSK modulation symbol is cyclic-shifted ($\alpha_{cs,x}$, x=1,5). When the number of cyclic shifts is N, N UEs can be multiplexed on the same CSI PUCCH RB. While a DM RS sequence is similar to a CSI sequence in the frequency domain, the DM RS sequence is not modulated by a CSI modulation symbol.

Parameters/resources for periodic CSI reports are configured semi-statically according to higher layer (e.g. Radio Resource Control (RRC) signaling. If PUCCH resource index $n_{PUCCH}^{(2)}$ is set for CSI transmission, for example, CSI is periodically transmitted on a CSI PUCCH linked to PUCCH resource index $n_{PUCCH}^{(2)}$. PUCCH resource index $n_{PUCCH}^{(2)}$ indicates a PUCCH RB and cyclic shift $\alpha_{cs}$.

Figure 7:
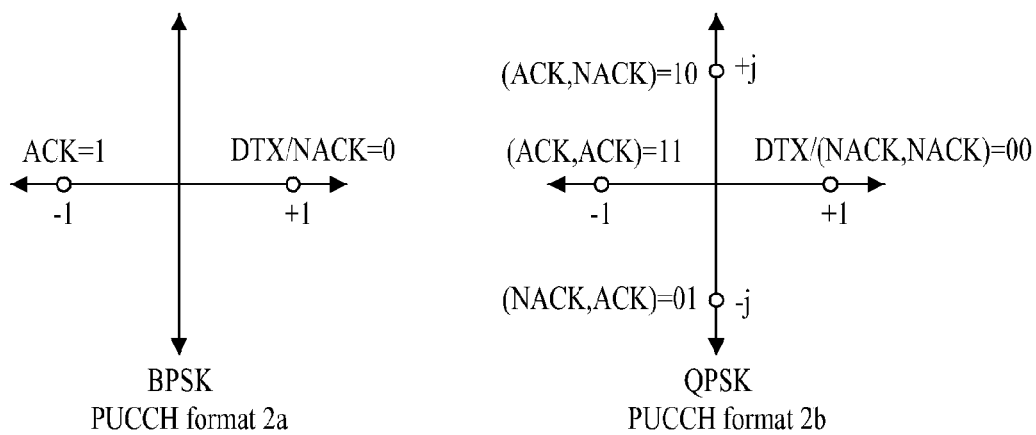
FIGS. 7 and 8 illustrate a method of multiplexing ACK/NACK (A/N) and CSI at a user equipment (UE)
Figure 8:
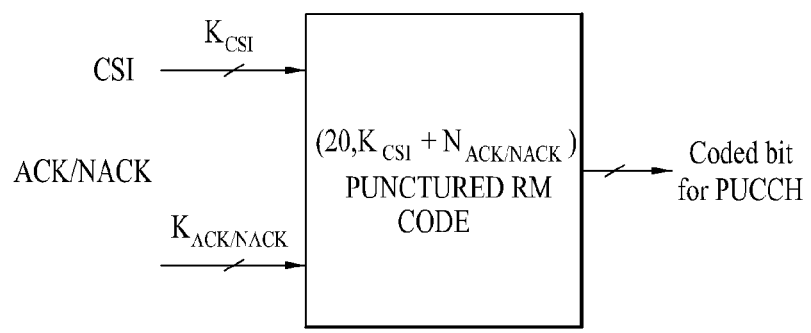

FIGS. 7 and 8 illustrate a method of multiplexing ACK/NACK and CSI at a UE.

In LTE, simultaneous transmission of ACK/NACK and CSI according to the UE is enabled by UE-specific higher layer signaling. When simultaneous transmission is not enabled and ACK/NACK needs to be transmitted on a PUCCH in a subframe to which CSI report is set, the CSI is dropped and only ACK/NACK is transmitted using PUCCH format 1a/1b. In the case of a subframe permitted by a BS to be used for the UE to simultaneously transmit ACK/NACK and CSI, the CSI and 1-bit or 2-bit ACK/NACK are multiplexed to the same PUCCH RB. This method is implemented differently in normal CP case and in extended CP case.

In case of normal CP, to simultaneously transmit 1-bit or 2-bit ACK/NACK and CSI (format 2a/2b), the UE modulates (unscrambled) ACK/NACK bits, as shown in FTC, 7. Accordingly, one ACK/NACK modulated symbol $d_{HARQ}$. ACK is coded into a binary value '1' and NACK is coded into a binary value '0'. The single ACK/NACK modulated symbol $d_{HARQ}$ is used for modulation of the second RS (i.e. SC-FDMA symbol #5) in each slot. That is, ACK/NACK is signaled using an RS for PUCCH format 2a/2b. The CSI is loaded in a UCI data part of PUCCH format 2a/2b. FIG. 7 illustrates that NACK (or NACK and NACK in case of two MIMO codewords) is modulation-mapped to +1 (no RS modulation). DTX (Discontinuous Transmission) is processed into NACK. DTX represents that the UE fails to detect a DL grant PDCCH.

In case of extended CP (one symbol per slot), 1-bit or 2-bit HARQ ACK/NACK and CSI are joint-coded to generate a (20, $k_{CSI}+k_{A/N}$) Reed-Muller based block code. A 20-bit codeword is transmitted on a PUCCH using the CSI channel structure shown in FIG. 6. Joint coding of ACK/NACK and CSI is performed as illustrated in FIG. 8. A maximum of the number of information bits supported by a block code is 13. In case of transmission of two codewords in downlink, $k_{CSI}=11$ CSI bits and $k_{A/N}=2$ bits.

Figure 9:
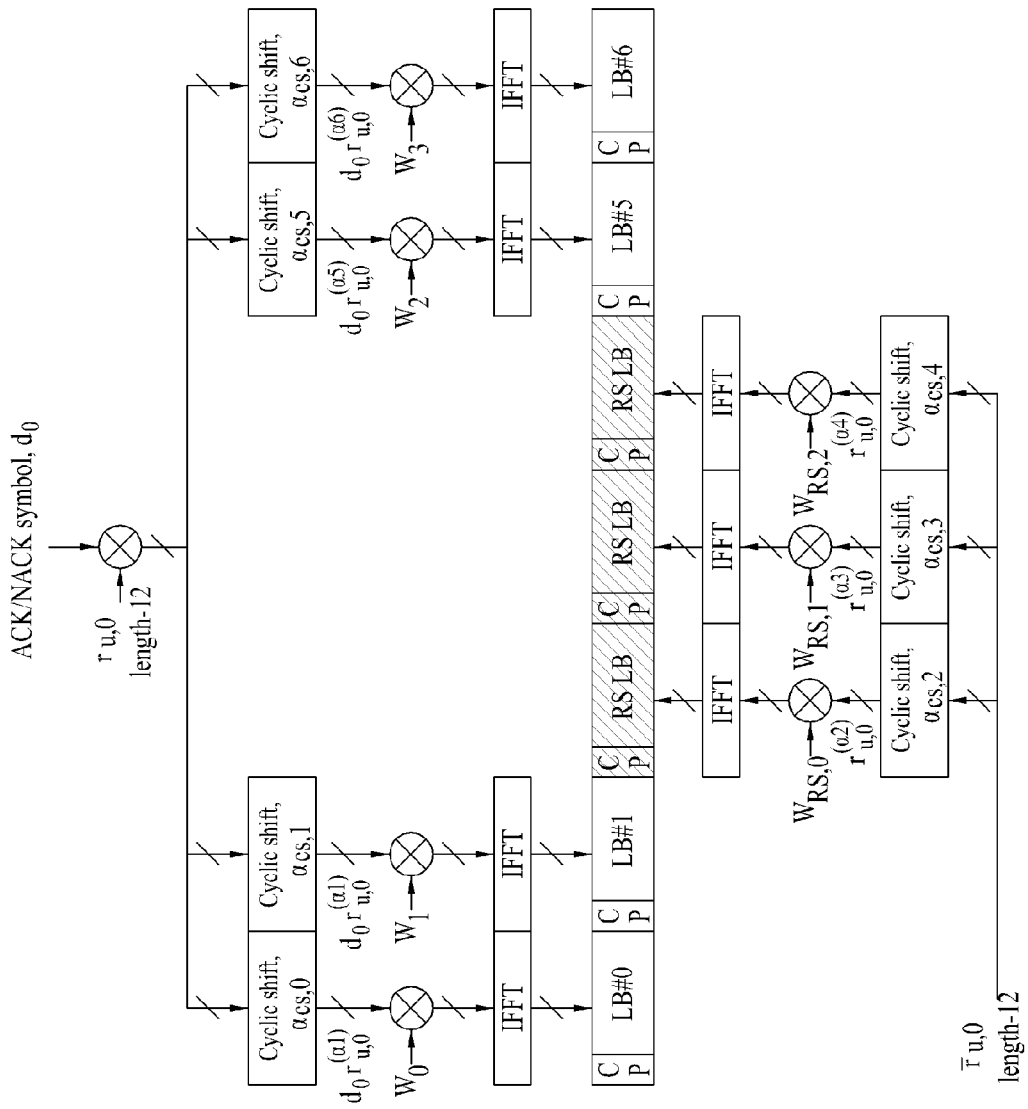
FIG. 9 illustrates a slot level structure of PUCCH format 1a/1b.

FIG. 9 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission.

Referring to FIG. 9, 1-bit and 2-bit ACK/NACK information are modulated according to BPSK and QPSK modulation schemes respectively, to generate one ACK/NACK modulation symbol $d_0$. The ACK/NACK information corresponds to 1 in the case of positive ACK and corresponds to 0 in case of negative ACK (NACK). Table 2 shows a modulation table defined for PUCCH formats 1a and 1b in a conventional LTE system.

TABLE 2

| PUCCH format | $b(0), \ldots, b(M_{bit} - 1)$ | $d(0)$ |
|---|---|---|
| 1a | 0 | 1 |
| | 1 | −1 |
| 1b | 00 | 1 |
| | 01 | −j |
| | 10 | j |
| | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 10:
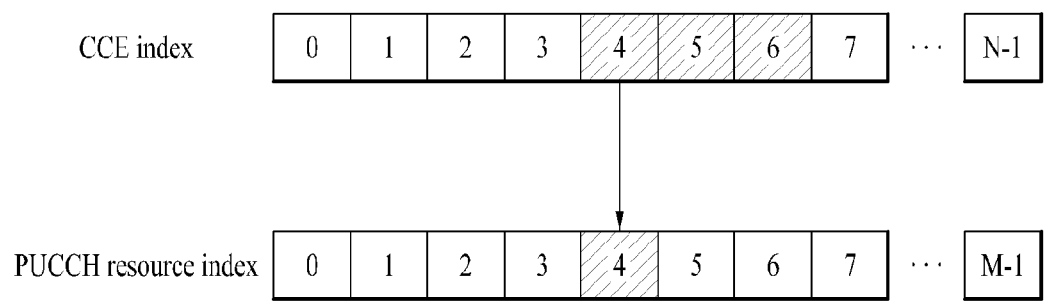
FIG. 10 illustrates an example of determining a PUCCH resource for ACK/NACK.

FIG. 10 illustrates an example of determining PUCCH resources for ACK/NACK. In an LTE system, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the US is composed of one or more CCEs. The UE transmits the ACK/NACK signal through a PUCCH resource corresponding to a specific one (e.g. first CCE) of the CCEs constituting the received PDCCH.

Referring to FIG. 10, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 8 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in an LTE system is determined as follows.

$$n^{(1)}_{PUCCH} = n_{CCE} + N^{(1)}_{PUCCH}$$ [Equation 1]

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

When the LTE system operates in TDD, a UE transmits one multiplexed ACK/NACK signal for a plurality of PDSCHs received through subframes at different timings. Specifically, the UE transmits one multiplexed ACK/NACK signal for a plurality of PDSCHs using an ACK/NACK channel selection scheme (simply, channel selection scheme). The ACK/NACK channel selection scheme is also referred to as a PUCCH selection scheme. When the UE receives a plurality of DL data in the ACK/NACK channel selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 3 shows an ACK/NACK channel selection scheme defined in the LTE system.

TABLE 3

| HARQ-ACK(0), HARQ-ACK(1), HARQ-ACK(2), HARQ-ACK(3) | $n^{(1)}_{PUCCH,X}$ | Subframe b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, HARQ-ACK(i) indicates the HARQ ACK/NACK/DTX result of an i-th data unit (0 ≤ i ≤ 3). DTX (Discontinuous Transmission) represents that there is no transmission of a data unit corresponding to HARQ-ACK(i) or the UE does not detect the data unit corresponding to HARQ-ACK(i). Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except some cases (NACK/DTX, N/D).

Figure 11:
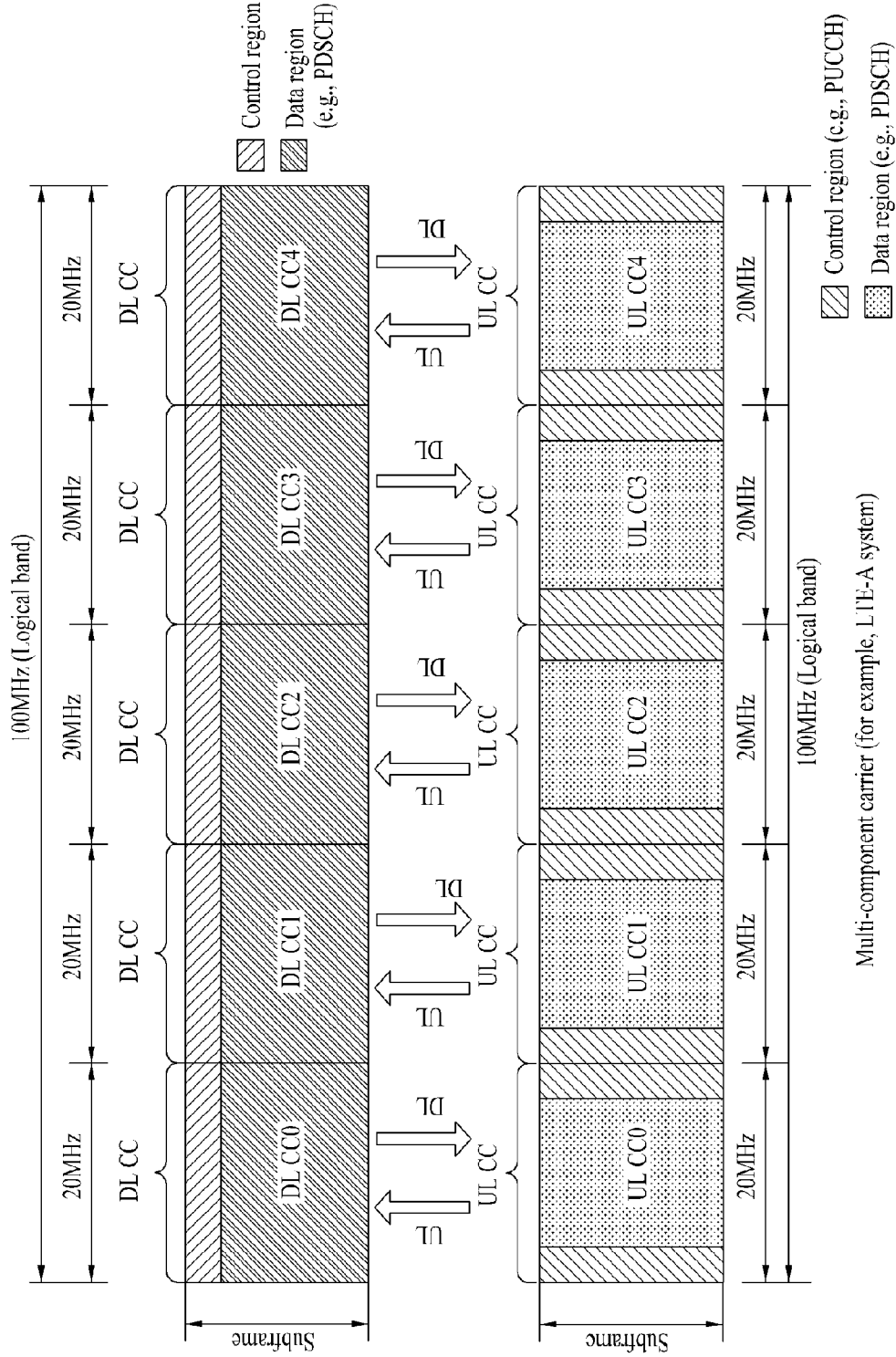
FIG. 11 illustrates a carrier aggregation (CA) communication system.

FIG. 11 illustrates a Carrier Aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a Component Carrier (CC). The CC can be regarded as a carrier frequency (or center carrier, center frequency) for the frequency block.

Referring to FIG. 11, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell in order to manage radio resources. The cell is defined as a combination of DO resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while being in an RRC connected state, only one serving cell configured with a PCell exists. Conversely, for a UE that is in an RRC Connected state and supports CA, one or more serving cells including a PCell and a SCell are provided. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC#0 and a PDSCH corresponding thereto can be transmitted through DL CC#2. For cross-CC scheduling, introduction of a Carrier Indicator Field (CIF) can be considered. The presence or absence of a CIF in a PDCCH can be set semi-statically and HE-specifically (or UE-group-specifically) according to higher layer signaling (e.g. RRC signaling). The base line of PDCCH transmission is summarized as follows.

CIF disabled: A PDCCH on a DL CC allocates a PDSCH resource on the same DL CC or allocates a PUSCH resource on a linked UL CC.

CIF enabled: A PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. The PDCCH monitoring DL CC set can be determined US-specifically, UE-group-specifically or cell-specifically, The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 12:
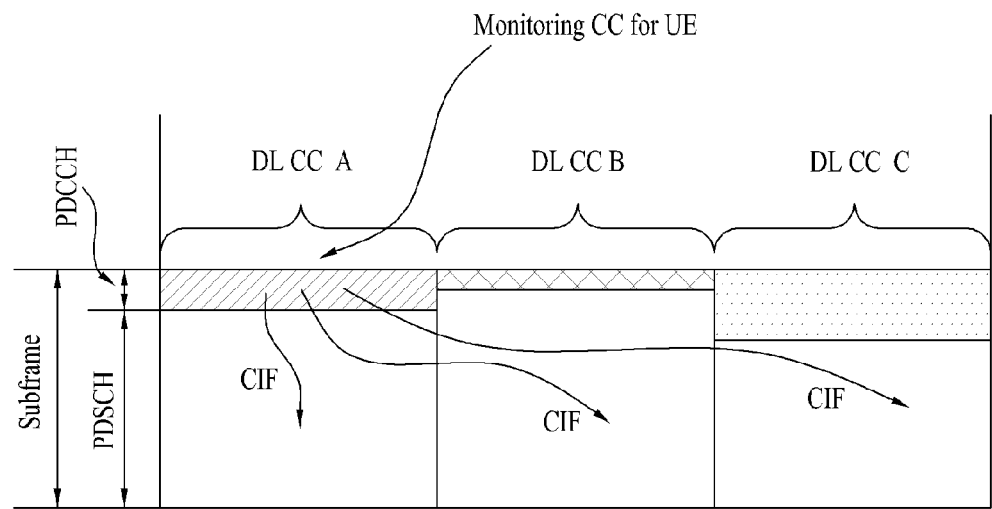
FIG. 12 illustrates cross-carrier scheduling.

FIG. 12 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to a PDCCH monitoring DL CCs do not deliver PDCCHs. LTE-A considers transmission of a plurality of ACK/NACK information/signals with respect to a plurality of PDSCHs, which are transmitted through a plurality of DL CCs, through a specific UL CC. To achieve this, it can be considered to joint-code (Reed-Muller code, Tail-biting convolutional code, etc.) a plurality of ACK/NACKs and transmit a plurality of ACK/NACK information/signals using PUCCH format 2, or a new PUCCH format (referred to as an Enhanced PUCCH (E-PUCCH) or PUCCH format 3), distinguished from ACK/NACK transmission using PUCCH format 1a/1b in the LTE system. PUCCH format 3 includes the following block-spreading based PUCCH format. After joint coding, ACK/NACK transmission using PUCCH format 2/PUCCH format 3 is exemplary, and PUCCH format 2/PUCCH format 3 can be used without being limited to UCI transmission. For example, PUCCH format 2/PUCCH format 3 can be used to transmit ACK/NACK, CSI (e.g. CQI, PMI, RI, PTI, etc.), SR, or two ore more thereof. Accordingly, PUCCH format 2/PUCCH format 3 can be used to transmit joint-coded UCI codewords irrespective of type/number/size of UCI.

Figure 13:
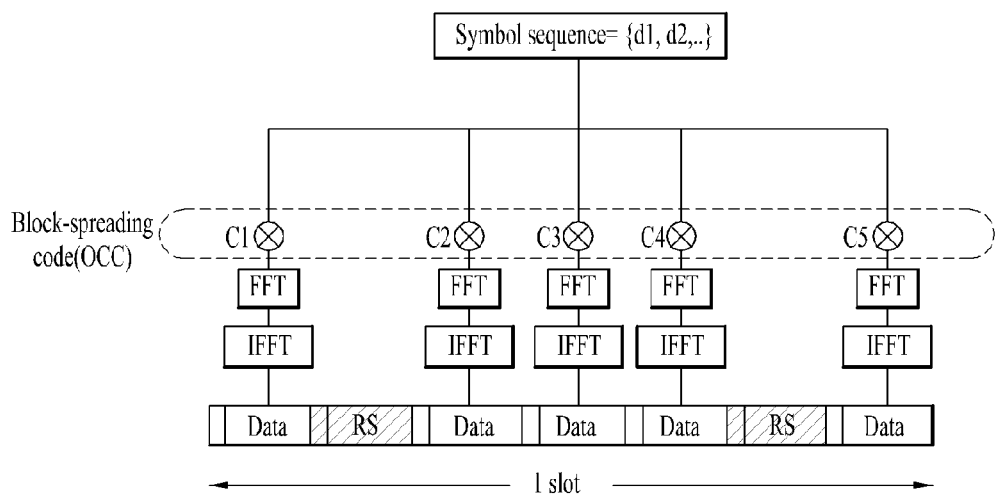
FIGS. 13 and 14 illustrate a block-spreading based E-PUCCH format.

FIG. 13 illustrates a block-spreading-based PUCCH format 3 at a slot level. In PUCCH format 2 of LTE, one symbol sequence (d0, d1, d2, d3, or d4) is transmitted over the time domain and UE multiplexing is performed using CS ($\alpha_{cs,x}$, x=0, 1, 2, 3, 4) of a Constant-Amplitude Zero Auto-Correlation (CAZAC) sequence $r_{u,o}$, as shown in FIG. 6. In the block-spreading based PUCCH format 3, one symbol sequence is transmitted over the frequency domain and UE multiplexing is performed using Orthogonal Cover Code (OCC) based time-domain spreading. That is, the symbol sequence is time-domain-spread using the OCC and transmitted. Control signals of a plurality of UEs can be multiplexed on the same RB using the OCC.

Referring to FIG. 13, 5 SC-FDMA symbols (i.e., UCI data part) are generated from one symbol sequence {d1, d2, ... } using a length-5 (Spreading Factor (SF)=5) OCC (C1, C2, C3, C4, C5). The symbol sequence {d1, d2, ... } may be a modulation symbol sequence or a codeword bit sequence. When the symbol sequence {d1, d2, ... } corresponds to the codeword bit sequence, The block diagram of FIG. 13 further includes a modulation block. In FIG. 13, while 2 RS symbols (i.e., RS part) are used in one slot, it is possible to consider various applications including a scheme of using an RS part composed of 3 RS symbols and a UCI data part configured using an OCC with SF=4. Here, an RS symbol can be generated from a CAZAC sequence having a specific cyclic shift. An RS can be transmitted in such manner that a specific OCC is applied to (multiplied by) a plurality of RS symbols in the time domain. Block-spread UCI is subjected to Fast Fourier Transform (FFT) and Inverse FFT (IFFT) for each SC-FJDMA symbol and transmitted to a network. That is, the block-spreading scheme modulates control information using SC-FDMA, distinguished from PUCCH format 1 or 2a/2b of LTE.

Figure 14:
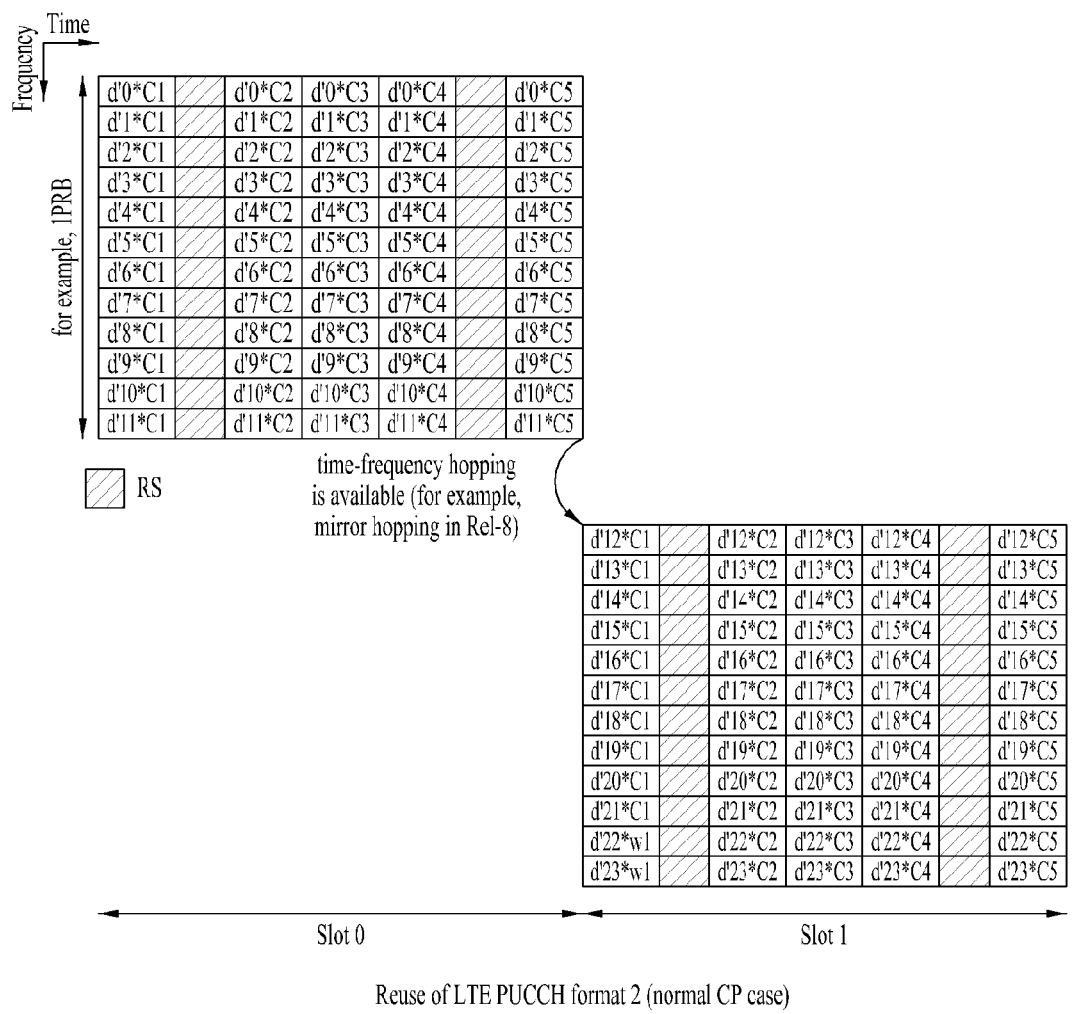

FIG. 14 illustrates PUCCH format 3 at a subframes level.

Referring to FIG. 14, in slot 0, symbol sequence {d'0, d'1, ..., d'11} is mapped to a subcarrier of one SC-FDMA symbol and mapped to 5 SC-FDMA symbols according to block spreading using OCC C1 to C5. Similarly, in slot 1, symbol sequence {d'12, d'13, ..., d'23} is mapped to a subcarrier of one SC-FDMA symbol and mapped to 5 SC-FDMA symbol according to block-spreading using ODD C1 to C5. Here, symbol sequences {d' 0, d'1, ..., d'11} and {d'12, d'13, ..., d'23} in slots 0 and 1 represent symbol sequence {d1, d2, ... }, shown in FIG. 14, which has been subjected to FFT or FFT/IFFT. When symbol sequence {d'0, d'1, ..., d'11} or {d'12, d'13, ..., d'23} corresponds to symbol sequence {d1, d2, ... } which has been subjected to FFT, IFFT is additionally applied to symbol sequence {d'12, d'13, ..., d'23} or {d'12, d'13, ..., d'23} in order to generate SC-FDMA symbols. The entire symbol sequence {d'0, d'1, ..., d'23} is generated by joint-coding one or more pieces of UCI, and the first halt (d'0, d'1, ..., d'11) is transmitted through slot 0 and the remaining {d'12, d'13, ..., d'23} is transmitted through slot 1. The OCC can be changed based on slot and UCI data can be scrambled for each SC-FDMA symbol.

In the following, a channel-coding based UCI (e.g. a plurality of ACK/NACKs) transmission scheme using PUCCH format 2 or E-PUCCH format (or PUCCH format 3) is referred to as "multi-bit UCI coding" transmission scheme for convenience of description. For example, the multi-bit UCI coding transmission scheme joint-codes ACK/NACK signals or DTX information (indicating that no PDCCH is received/detected) with respect to PDSCHs and/or PDCCHs that indicate Semi-Persistent Scheduling (SPS) release of a plurality of DL cells and/or to generate a coded ACK/NACK block, and transmits the coded ACK/NACK block. If a UE operates in a Single User-Multiple Input Multiple Output (SU-MIMO) mode in a DL cell and receives 2 codewords, 4 feedback states of ACK/ACK, ACK/NACK, NACK/ACK, and NCK/NACK, or five feedback states additionally including DTX can be present for the cell. If the UE receives a single codeword, 3 feedback states of ACK, NACK and DTX can be present (2 feedback states of ACK and NACK/DTX can be present if NACK and DTX are equally processed). Accordingly, when the UE aggregates maximum 5 DL cells and operates in the SU-MIMO mode, maximum $5^5$ feedback states can be present. Therefore, a required ACK/NACK payload size is at least 12 bits. If DTX and NACK are equally handled, the number of feedback states becomes $4^5$ and the required ACK/NACK payload size is at least 10 bits.

An ACK/NACK multiplexing (i.e., ACK/NACK channel selection) method (refer to Table 3) applied to LTE TDD employs an implicit ACK/NACK channel selection scheme using a PUCCH resource corresponding to a PDCCH that schedules a PDSCH of a UE (i.e., PUCCH resource linked with the smallest CCE index) so as to secure PUCCH resources for the UE. However, when the implicit scheme is applied using PUCCH resources in different RBs, performance deterioration may occur. Accordingly, the LTE-A system additionally considers "explicit ACK/NACK channel selection" scheme that uses PUCCH resources (preferably, a plurality of PUCCH resources in the same RB or consecutive RBs) previously reserved for UEs through RRC signaling. Furthermore, the LTE-A system considers ACK/NACK transmission through one UE-specific UL cell (e.g. PCell).

Table 4 shows designation of PUCCH resources for HARQ-ACK.

TABLE 4

| Value of HARQ-ACK resource for PUCCH (ARI) | $n_{PUCCH}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

ARI represents an ACK/NACK resource indicator. In Table 4, the higher layer includes RRC layer and an ARI value can be designated by a PDCCH that delivers a DL grant. For example, the ARI value can be designated using an SCell PDCCH and/or a Transmit Power Control (TPC) field of one or more PCell PDCCHs that do not correspond to DAI initial value.

Figure 15:
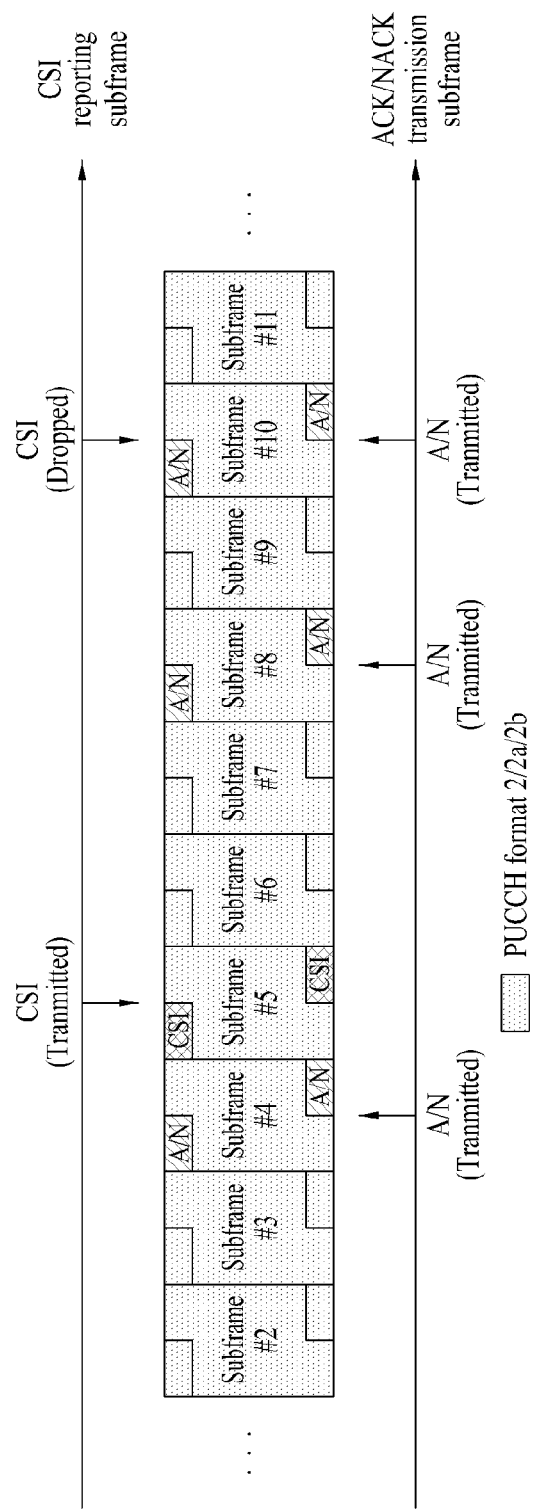
FIG. 15 illustrates an example of dropping CSI when an ACK/NACK transmission time and a CSI transmission time collide.

FIG. 15 illustrates an example of dropping periodic CSI when a subframe for multiple ACK/NACK transmission and a subframe for periodic CSI transmission collide. In this example, it is assumed that a CSI reporting period is set to 5 msec (i.e. 5 subframes).

Referring to FIG. 15, the CSI is periodically transmitted. In this example, the CSI needs to be transmitted in subframes #5 and #10. An ACK/NACK transmission time depends on downlink scheduling. In this example, ACK/NACK is transmitted in subframes #4, #8 and #10. When the ACK/NACK transmission time and a CSI transmission time do not collide, a UE transmits the ACK/NACK and CSI in the corresponding subframes. If the ACK/NACK transmission time and a CSI transmission time collide, the UE may drop the CSI in order to maintain single carrier properties. For example, only ACK/NACK can be transmitted and CSI feedback can be dropped in subframe #10 in which the ACK/NACK transmission time and the CSI transmission time overlap.

If single carrier property is not required in UL transmission and different PUCCH formats and/or different PUCCH resources are assigned for the ACK/NACK and CSI feedback, the UE can simultaneously transmit the ACK/NACK and CSI.

Figure 16:
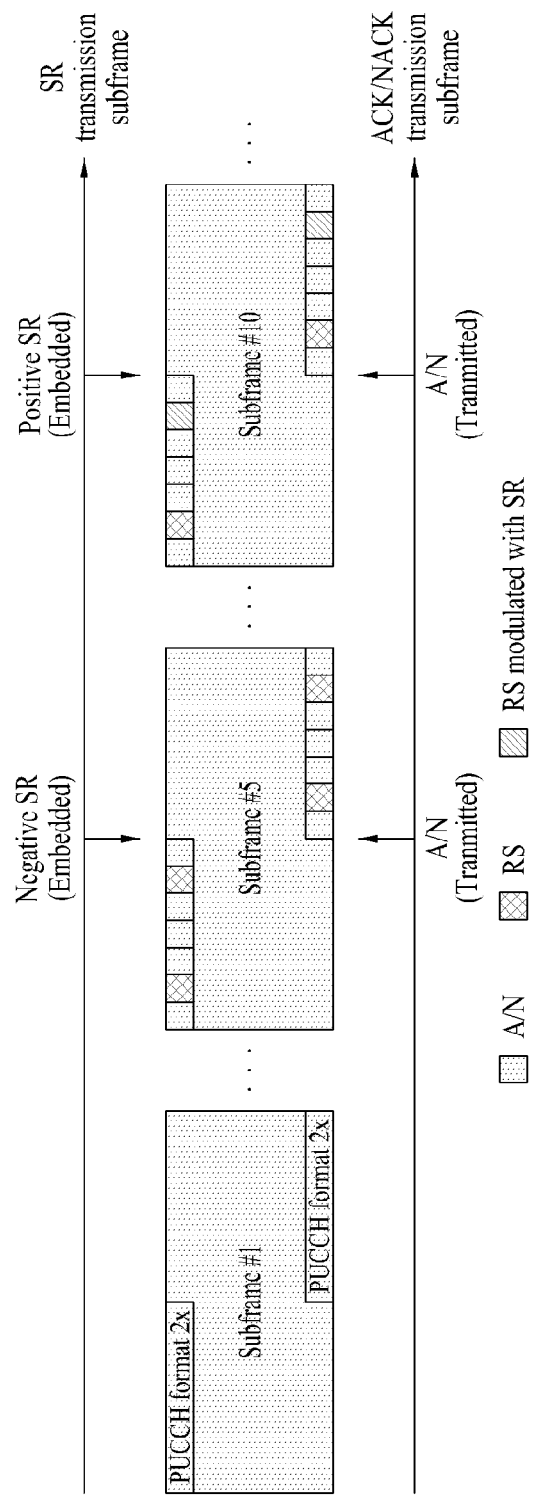
FIG. 16 illustrates an example of transmitting ACK/NACK and an SR together.

FIG. 16 illustrates an example of simultaneously transmitting ACK/NACK and an SR by embedding the SR in a PUCCH format 2a/2b resource that carries multiple ACK/NACKs. This example is based on the assumption that a subframe (i.e. SR subframe) interval is set to 5 msec (i.e. 5 subframes) for SR transmission.

Referring to FIG. 16, a subframe capable of transmitting the SR is periodically set. In this example, the SR can be transmitted in subframes #5 and #10. The UR needs to simultaneously transmit multiple ACK/NACKs and SR in the subframes #5 and #10. In the normal CP case, 1-bit SR information (e.g. positive SR:1, negative SR:0) is used to modulate the second RS symbol of PUCCH format 2a/2b (similar to FIG. 7), and thus the SR and ACK/NACK can be simultaneously transmitted. When the PUCCH format 2a/2b resource is configured/occupied for CSI feedback, the 1-bit SR information is used to modulate the second RS symbol of PUCCH format 2a/2b, and thus the SR and CSI can be simultaneously transmitted. In extended CP case, the 1-bit SR information can be joint coded (e.g. coding using a RM code, TBCC, etc.) with the ACK/NACK or CSI, and two UCIs (i.e. SR+ACK/NACK or SR+CSI) can be transmitted on the same PUCCH format 2a/2b resource (similar to FIG. 8).

In this case, the SR can be embedded in PUCCH format 2 for CSI transmission only when ACK/NACK transmission is not required at the corresponding time (i.e. time when SR transmission and CSI transmission overlap).

In LTE, when only ACK/NACK information about a single CC is present and the ACK/NACK transmission time and CSI transmission time collide, as described above, the ACK/NACK information can be transmitted through RS modulation (in case of normal CP) of PUCCH format 2 for transmitting the CSI (refer to FIG. 7) or through joint coding (in case of extended CP) (refer to FIG. 8). In LTE-A, an E-PUCCH format (or PUCCH format 3) based "multi-bit ACK/NACK coding" or "ACK/NACK channel selection" scheme is considered for transmission of multiple ACK/NACKs for multiple CCs, as described above. Considering transmission of ACK/NACK through these two schemes, it may be desirable to abandon (drop) CSI transmission and transmit ACK/NACK only when CSI transmission time through PUCCH format 2 and the ACK/NACK transmission time are overlapped. That's why ACK/NACK performance deterioration may occur when the multiple ACK/NACKs for multiple CCs are transmitted through RS modulation of PUCCH format 2 that transmits CSI or through joint coding as in LTE. However, unconditional CSI drop when the ACK/NACK transmission time and CST transmission time overlap may cause problems including a delay in DL scheduling due to lack of information about the CSI.

A description will be given of a method for efficiently transmitting UCI when multiple UCI transmission times collide. First of all, terms relating to the present invention are arranged.

HARQ-ACK: This represents a reception response result for DL transmission (e.g. PDSCH or SPS release PDCCH), that is, an ACK/NACK/DTX response (simply, ACK/NACK response). The ACK/NACK/DTX response represents ACK, NACK, DTX or NACK/DTX. "HARQ-ACK for a specific CC" or "HARQ-ACK of a specific CC" denotes an ACK/NACK response to a DL signal (e.g. PDSCH) with respect to the CC. An ACK/NACK state means a combination corresponding to a plurality of HARQ-ACKs. Here, a PDSCH can be replaced by a TB or a CW.

PUCCH index: This corresponds to a PUCCH resource. For example, the PUCCH index indicates a PUCCH resource index. The PUCCH resource index is mapped to at least one of an Orthogonal Cover (OC), Cyclic Shift (CS) and PRB. When the ACK/NACK channel selection scheme is applied, the PUCCH index includes a PUCCH (resource) index for PUCCH format 1b.

PUCCH resource linked to CC: This represents a PUCCH resource (refer to Equation 1, implicit PUCCH resource) linked to a PDCCH corresponding to a PDSCH on a CC, or a PUCCH resource (explicit PUCCH resource) designated/allocated by the PDCCH corresponding to the PDSCH on the CC. The PUCCH resource in the explicit PUCCH resource scheme can be designated/allocated using an ACK/NACK Resource Indicator (ARI).

ARI: This is used to indicate a PUCCH resource. For example, the ARI can be used to indicate a resource modification value (e.g. offset) with respect to a specific PUCCH resource (configured by a higher layer). Furthermore, the ARI can be used to indicate a specific PUCCH resource (group) index in a PUCCH resource (group) set (configured by a higher layer). The ARI can be included in a TPC field of a PDCCH corresponding to a PDSCH on an SCC. PUCCH power control is performed in a TPC field in a PDCCH (that is, PDCCH corresponding to a PDSCH on a PCC) that schedules the PCC. The ARI can be included in a TPC field of a PDCCH other than a PDCCH that has a Downlink Assignment Index (DAI) initial value and schedules a specific cell (e.g. PCell). The ARI is interchangeably used with a HARQ-ACK resource indication value.

Implicit PUCCH resource: This represents a PUCCH resource/index linked to the smallest CCE index of a PDCCH that schedules a PCC (refer to Equation 1).

Explicit PUCCH resource: This can be indicated using the ARI. When the ARI cannot be applied, the explicit PUCCH resource may be a PUCCH resource previously fixed by higher layer signaling. All explicit PUCCH indexes allocated to one UE can be contiguous, or indexes for resource groups can be contiguous. Otherwise, all the indexes can be independently allocated.

PDCCH scheduling CC: This represents a PDCCH that schedules a PDSCH on a CC, that is, a PDCCH corresponding to a PDSCH on the CC.

PCC PDCCH: This represents a PDCCH that schedules a PCC. That is, the PCC PDCCH indicates a PDCCH corresponding to a PDSCH on the PCC. When it is assumed that cross-carrier scheduling is not allowed for the PCC, the PCC PDCCH is transmitted only on the PCC.

SCC PDCCH: This represents a PDCCH that schedules an SCC. That is, the SCC PDCCH indicates a PDCCH corresponding to a PDCCH on the SCC. When cross-carrier scheduling is allowed for the SCC, the SCC PDCCH can be transmitted on the PCC. On the other hand, when cross-carrier scheduling is not allowed for the SCC, the SCC PDCCH is transmitted only on the SCC.

SR subframe: This represents a UL subframe configured for SR transmission. According to implementation, The SR subframe can be defined as a subframe in which SR information is transmitted, or a subframe allowed to transmit the SR information. The SR subframe can be specified according to higher layer signaling (e.g. period, offset).

CSI subframe: This represents an uplink subframe configured for CSI transmission. The CSI subframe can be specified according to higher layer signaling (e.g. period, offset).

UCI Transmission in FDD System

The present embodiment proposes a scheme of dropping CSI according to predetermined conditions and transmitting only ACK/NACK through a PUCCH format/resource (e.g. PUCCH format 3) for ACK/NACK, or simultaneously transmitting the CSI and ACK/NACK by embedding the ACK/NACK in PUCCH format 2/2a/2b, if the ACK/NACK transmission time and CSI transmission time collide when PUCCH format 3 based multi-bit ACK/NACK coding and implicit and/or explicit PUCCH resource based ACK/NACK channel selection scheme are applied for transmission of multiple ACK/NACKs. The ACK/NACK can be embedded in PUCCH format 2/2a/2b through RS modulation (in case of normal CP) in a PUCCH format (refer to FIG. 7) or through joint coding (in case of extended CP) (refer to FIG. 8). Here, the predetermined conditions includes a case in which transmission of only ACK/NACK information about one specific CC (e.g. DL PCC) (or DL PCell) is required at the CSI transmission time. For example, the predetermined conditions include a case in which the CSI transmission time corresponds to subframe n and the UE receives one PDSCH through one specific CC only in subframe n−4. Here, the PDSCH is used to represent both a PDSCH and PDCCH that require ACK/NACK feedback. For example, the PDSCH is used to represent a PDCCH that orders SPS release. The proposed scheme is referred to as "Alt 1" for convenience of description. Usage/non-usage of this scheme may be UE-specifically signaled through higher layer (e.g. RRC) signaling.

The above scheme may be applied to a case in which NACK or DTX is identified to all PDSCHs received through all secondary DL CCs other than the primary DL CC at the CSI transmission time without dropping the CSI. That is, it is possible to simultaneously transmit the CSI and ACK/NACK by embedding ACK/NACK for the primary DL CC in PUCCH format 2/2a/2b.

It is possible to signal whether simultaneous transmission of the CSI and ACK/NACK and simultaneous transmission of SRS and ACK/NACK are permitted through a higher layer. Particularly, when simultaneous transmission of the SRS and ACK/NACK is permitted, a plurality of specific subframes may be present, which are set to use a shortened PUCCH format for ACK/NACK transmission. The shortened PUCCH format means a PUCCH format that transmits a UL signal using only SC-FDMA (or OFDM) symbols other than an SC-FDMA (or OFDM) symbol (e.g. the last symbol of a subframe) capable of transmitting the SRS in a subframe in which a corresponding PUCCH is transmitted. For reference, a normal PUCCH format means a PUCCH format that performs UL signal transmission using up to SC-FDMA (or OFDM) symbol (e.g. the last symbol of a subframe) capable of transmitting the SRS in a subframe. When the CSI, ACK/NACK and SRS need to be transmitted at the same time (i.e. in collided subframes) while simultaneous transmission of the CSI and ACK/NACK is permitted in a CC aggregation based FDD system, the following UE operations can be considered on the basis of Alt 1 according to whether simultaneous transmission of the SRS and ACK/NACK is permitted.

When simultaneous transmission of SRS and A/N is permitted
  In case of using the shortened PUCCH format in collided subframes
    Case #1) Only PDSCH for a PCC is received: It is possible to drop the SRS and simultaneously transmit the CSI and A/N in PUCCH format 2/2a/2b using Alt 1.
    Case #2) All cases other than case #1: It is possible to drop the CSI and simultaneously transmit the SRS and A/N using the shortened PUCCH format. Considering UCI priority defined in LTE, SRS drop can be considered because the CSI has priority higher than the SRS. However, it is advantageous to transmit the SRS because the CSI is dropped according to collision of the CSI and A/N in cases other than case #1.
  In case that the shortened PUCCH format is not used in collided subframes
    Case #1) Only PDSCH for the PCC is received: It is possible to drop the SRS, and simultaneously transmit the CSI and A/N in PUCCH format 2/2a/2b using Alt 1.
    Case #2) All cases other than case #1: It is possible to drop the CSI and SRS, and transmit A/N using the normal PUCCH format.
When simultaneous transmission of SRS and A/N is not permitted Case #1) Only PDSCH for the PCC is received: It is possible to drop the SRS, and simultaneously transmit the CSI and A/N in PUCCH format 2/2a/2b using Alt 1.

Case #2) All cases other than case #1: It is possible to drop the CSI and SRS, and transmit A/N using the normal PUCCH format.

In case of UE aggregation based FDD, the following UE operations can be considered when simultaneous transmission of the CSI and A/N is required according to a combination of PUCCH/PUSCH simultaneous transmission permission (referred to as "PUCCH+PUSCH ON" for convenience)/ nonpermission (referred to as "PUCCH+PUSCH OFF" for convenience) and CSI+A/N simultaneous transmission permission (referred to as "CSI+A/N ON" for convenience)/ nonpermission (referred to as "CSI+A/N OFF" for convenience) on the basis of Alt 1.

In case of PUCCH+PUSCH OFF and CSI+A/N OFF
When no PUSCH is transmitted
It is possible to drop the CSI and transmit A/N over a PUCCH.
When a PUSCH is transmitted
It is possible to piggy back the CSI and A/N on the PUSCH to transmit the CSI and A/N. In this case, no PUCCH is transmitted.

In case of PUCCH+PUSCH OFF and CSI+A/N ON
When no PUSCH is transmitted
Case #1) Only PDSCH for the PCC is received: It is possible to simultaneously transmit the CSI and A/N over the PUCCH using Alt 1.
Case #2) All cases other than case #1: It is possible to drop the CSI and transmit A/N over the PUCCH.
When a PUSCH is transmitted
It is possible to piggy back the CSI and A/N on the PUSCH to transmit the CSI and A/N. In this case, no PUCCH is transmitted.

In case of PUCCH+PUSCH ON and CSI+A/N OFF
When no PUSCH is transmitted
It is possible to drop the CSI and transmit A/N over the PUCCH.
When a PUSCH is transmitted
It is possible to piggy back the CSI on the PUSCH and transmit A/N over the PUCCH.

In case of PUCCH+PUSCH ON and CSI+A/N ON
When no PUSCH is transmitted
Case #1) Only PDSCH for the PCC is received: It is possible to simultaneously transmit the CSI and A/N over the PUCCH using Alt 1.
Case #2) All cases other than case #1): It is possible to drop the CSI and transmit A/N over the PUCCH.
When a PUSCH is transmitted
Case #1) Only PDSCH for the PCC is received: It is possible to simultaneously transmit the CSI and A/N over the PUCCH using Alt 1.
Case #2) All cases other than case #1: It is possible to piggy back the CSI on the PUSCH and transmit A/N over the PUCCH.

UCI Transmission in TDD System

It is apparent that the aforementioned proposed scheme is applicable to a CC aggregation based TDD system as well as the CC aggregation based FDD system. The proposed scheme used in a TDD system will now be described in detail. For multi-ACK/NACK transmission, E-PUCCH format based multi-bit UCI coding and implicit and/or explicit PUCCH resource based ACK/NACK (A/N) channel selection scheme may be used. In a TDD system, multiple ACK/NACKs may be generated according to a plurality of CC configurations, a plurality of DL subframe configurations corresponding to one UL subframe in which ACK/NACK is transmitted, or a combination thereof.

TDD Scheme 1

This scheme drops CSI and transmits only ACK/NACK, or embeds ACK/NACK counter information in PUCCH format 2/2a/2b, according to predetermined conditions when an ACK/NACK transmission time and a CSI transmission time collide in a TDD system. When the CSI is dropped, the ACK/NACK can be transmitted using a multi-bit UCI coding scheme (using E-PUCCH format (or PUCCH format 3), for example) or an ACK/NACK (A/N) channel selection scheme (using PUCCH format 1b, for example), preferably, the ACK/ NACK (A/N) channel selection scheme (using PUCCH format 1b).

ACK counter: This indicates the total number of ACKs (or the number of some of the ACKs) for all received PDSCHs (in view of ACK/NACK feedback, PDSCHs may include a PDCCH (e.g. a PDCCH that orders SPS release) that requires ACK/NACK feedback in the specification). Specifically, the number of ACKs can be signaled by a UE when only ACKs are generated for all received PDSCHs without detection of DTX, and the number of ACKs can be counted as 0 (or processed as DTX or NACK) when the UE detects DTX or when the received PDSCHs include at least one NACK.

Table 5 shows the number of ACKs and bit values b(0)b(1) defined in LTE.

TABLE 5

| Number of ACK among multiple $(U_{DAI} + N_{SPS})$ ACK/NACK responses | b(0), b(1) |
|---|---|
| 0 or None (UE detects that at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

In Table 5, $U_{DAI}$ represents the number of PDCCH(s) having allocated PDSCH transmission (s) and PDCCHs that order DL SPS release, which are detected by a UE in DL subframe(s) n − k (k ∈ K). $N_{SPS}$ denotes the number of PDSCH transmissions having no PDCCH corresponding thereto in DL subframe(s) n − k (k ∈ K). UL subframe n corresponds to a subframe that requires ACK/NACK transmission.

K is given according to UL-DL configuration. Table 6 shows K: $\{k_0, k_1, \ldots k_{M-1}\}$ defined in LTE TDD, Here, M denotes the number of DL subframes corresponding to one UL subframe. Accordingly, a TDD configuration in which (the number of DL subframes): (the number of UL subframes)=M:1 means a TDD configuration set such that ACK/ NACK information about data/control channel(s) received through M DL subframe(s) is fed back through one UL subframe. The value M may depend on the UL subframe.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Embedding ACK/NACK counter information to PUCCH format 2/2a/2b can be achieved through RS modulation of PUCCH format (refer to FIG. 7) (in case of normal CP) or joint coding (refer to FIG. 8) (in case of extended CP). In the present example, the predetermined conditions include a case in which only transmission of ACK/NACK information about DL subframe(s) of one specific CC (e.g. DL PCC) (or DL PCell) is required at the CSI transmission time. For example, the predetermined conditions include a case in which the CSI transmission time corresponds to subframe n and the UE receives a PDSCH only through one specific CC in subframe n−k. Here, the PDSCH means both a PDSCH and a PDCCH that requires ACK/NACK feedback. For example, the PDSCH may mean a PDCCH that orders SPS release. Usage/non-usage of this scheme can be UE-specifically signaled through higher layer (RRC) signaling.

When a DAI (Downlink Assignment Index) independently operates for each CC in TDD, it is possible to consider a case in which a DAI for only a PDSCH of a specific CC (e.g. PCC) is signaled through a PDCCH that schedules the specific CC. A DAI may be a DAI-counter, e.g. a parameter that indicates the order of scheduled PDSCHs on the basis of a predetermined order (e.g. order of DL subframes). When the DAI-counter is used, the ACK counter may signal 1) the number of ACKs only when the last received DAI counter value is identical with a total of the number of ACKs, or 2) the number of ACKs corresponding to a DAI-counter value that continuously increases from a DAI-counter initial value (PDSCH corresponding thereto). Here, the DAI may have an initial value of 0 or 1.

Table 7 shows an exemplary ACK counter. Table 7 shows a case in which the ACK counter is represented by 2 bits. The number of bits used to represent the ACK counter can be set according to implementation example in various manners.

TABLE 7

| Number of ACK among multiple ACK/NACK responses | b(0), b(1) |
|---|---|
| 0 or None (UE misses at least one DL assignment) (that is, DTX)) | 0, 0 |
| 1 | 1, 1 |
| 2 | 1, 0 |
| 3 | 0, 1 |
| 4 | 1, 1 |
| 4 | 1, 0 |
| 5 | 0, 1 |
| 6 | 1, 1 |
| 7 | 1, 0 |
| 8 | 0, 1 |
| 9 | 1, 1 |
| 0 | 1, 0 |

In a TDD configuration in which (the number of DL subframes):(the number of UL subframes)=M:1, when M is 2, it is possible to generate 2-bit ACK/NACK information for PDSCHs (or PDSCHs corresponding to DAI=1 and DAI=2 on the assumption that DAI starting with 1 is used) received through two DL subframes of a primary CC, and then the above-mentioned scheme (which transmits the 2-bit ACK/NACK information through RS modulation of PUCCH format 2 for CSI transmission or through joint coding) can be carried out without dropping CSI, only in a case in which PDSCHs are received through only the primary CC. Here, when the primary CC is configured as being a MIMO transmission mode, CW bundling may be applied to a PDSCH (or a PDSCH corresponding to each DAI value) received through each DL subframe. CW bundling is a scheme of transmitting bundled 1-bit ACK/NACK information for PDSCH(s) of a CC configured with the MIMO transmission mode (i.e. when a plurality of CWs are transmitted through a PDSCH, ACK is signaled only when all the CWs of the PDSCH correspond to ACK, and NACK is signaled in other cases).

When multi-bit ACK/NACK coding (i.e. E-PUCCH format (PUCCH format 3) is applied for TDD ACK/NACK transmission, it is possible to use the aforementioned scheme without dropping CSI when PDSCHs received through all secondary CCs other than the primary CC correspond to NACK or DTX at the CSI transmission time. That is, ACK counter information about multiple DL subframes of the primary CC can be transmitted through an RS symbol (i.e. RS modulation) of PUCCH format 2 in which CSI is transmitted or through a payload (i.e. joint coding).

When ACK counter based ACK/NACK channel selection is applied for TDD ACK/NACK transmission, it is possible to use the aforementioned scheme without dropping CSI when the number of ACKs is 0 (NACK or DTX) for all secondary CCs other than the primary CC at the CSI transmission time. That is, ACK counter information about multiple DL subframes of the primary CC can be transmitted through an RS symbol (i.e. RS modulation) of PUCCH format 2 in which CSI is transmitted or through a payload (i.e. joint coding).

Figure 17:
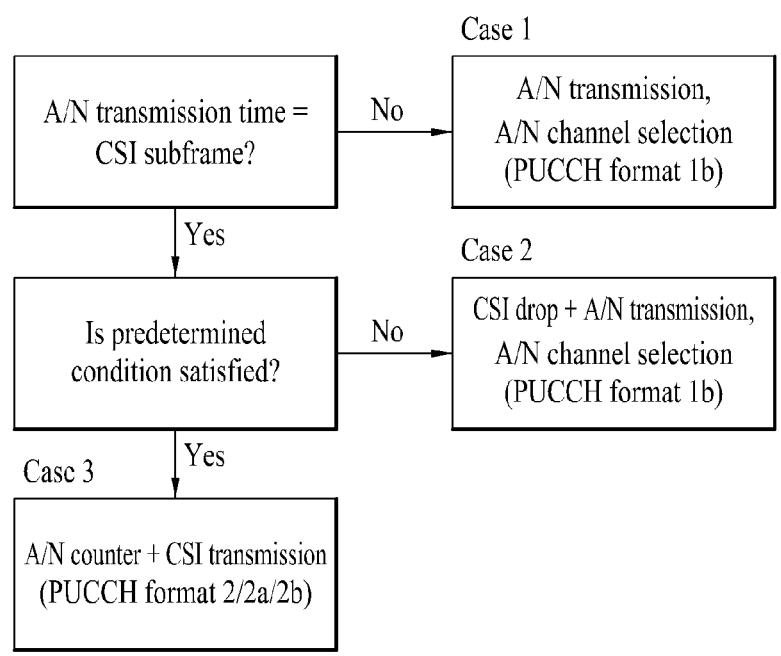
FIG. 17 illustrates a UCI transmission scheme according to an embodiment of the present invention.

FIG. 17 illustrates an exemplary UCI transmission scheme according to an embodiment of the present invention. It is assumed that a UE is configured to use the A/N channel selection scheme. FIG. 17 illustrates a PUCCH resource allocation procedure focused on ACK/NACK and CSI. The following three cases can be considered for transmission of ACK/NACK and CSI.

Case 1: ACK/NACK is transmitted in a non-CSI subframe.
Case 2: ACK/NACK is transmitted in a CSI subframe, and a predetermined condition is not satisfied.
Case 3: ACK/NACK is transmitted in a CSI subframe, and a predetermined condition is satisfied.

Referring to FIG. 17, ACK/NACK is transmitted using the A/N channel selection scheme in case 1. Specifically, a UE selects one PUCCH resource corresponding to multiple HARQ-ACKs from a plurality of PUCCH resources and transmits bit values (e.g. b(0)b(1)) corresponding to the multiple HARQ-ACKs using the selected PUCCH resource (refer to Table 3). PUCCH format 1b may be used for the A/N channel selection scheme.

Cases 2 and 3 show a case in which ACK/NACK needs to be transmitted in a CSI subframe. Case 2 corresponds to a case in which a predetermined condition is not satisfied whereas case 3 corresponds to a case in which the predetermined condition is satisfied. The predetermined condition includes a case in which transmission of only ACK/NACK information about DL subframe(s) of one specific CC (e.g. DL PCC) (or DL PCell) is required at the CSI transmission time (i.e. CSI subframe). For example, the predetermined condition includes a case in which the CSI transmission time corresponds to subframe n and the UE receives a downlink signal that requires ACK/NACK feedback only through one specific CC in subframe n−k. The downlink signal that requires ACK/NACK feedback includes a PDSCH and a PDCCH that orders SPS release. When the predetermined condition is not satisfied (i.e. in case 2), the UE drops CSI and transmits ACK/NACK only. In this case, ACK/NACK can be transmitted using the A/N channel selection scheme. Conversely, when the predetermined condition is satisfied (i.e. in case 3), the UE transmits both information that indicates the ACK/NACK and the CSI using a single PUCCH. Specifically, the information indicating the ACK/NACK counter can be embedded in the PUCCH format for CSI transmission and transmitted. More specifically, the information indicating the ACK/NACK counter can be loaded in the RS symbol (e.g. RS modulation) of PUCCH format 2/2a/2b for CSI transmission (refer to FIG. 7) or in a payload (e.g. joint coding) (refer to FIG. 8) and transmitted.

TDD Scheme 2

This scheme drops CSI and transmits only ACK/NACK, or embeds ACK/NACK in PUCCH format 2/2a/2b, according to predetermined conditions when an ACK/NACK transmission time and a CSI transmission time collide in a TDD system. When the CSI is dropped, the ACK/NACK can be transmitted using a multi-bit UCI coding scheme (e.g., using E-PUCCH format (or PUCCH format 3)) or an ACK/NACK (A/N) channel selection scheme (e.g., using PUCCH format 1b), preferably, the multi-bit UCI coding scheme (using E-PUCCH format or PUCCH format 3). When both the CSI and ACK/NACK are transmitted, TDD scheme 2 transmits full ACK/NACK information while TDD scheme 1 transmits compressed ACK/NACK information (e.g. ACK/NACK counter information).

In this scheme, the predetermined conditions include a case in which only one PDSCH (when a SPS PDSCH is not present) corresponding to a DAI initial value or the SPS PDSCH (when the SPS PDSCH is present) is received only through a primary CC (or PCell) in DL subframe(s) corresponding to a UL subframe (i.e. CSI subframe) for CSI transmission. For example, the predetermined conditions include a case in which the CSI transmission time corresponds to subframe n and a UE receives only one PDSCH (when a SPS PDSCH is not present) corresponding to the DAI initial value or the SPS PDSCH (when the SPS PDSCH is present) only through the primary CC in subframe n−k (n and n−k refers to Table 6). Here, the PDSCH means a PDSCH and a PDCCH that require ACK/NACK feedback. For example, the PDSCH means a PDCCH that indicates SPS release. Usage/non-usage of TDD scheme 2 can be UE-specifically signaled through higher layer (RRC) signaling.

DAI: DAI-counter may be a parameter indicating the order of PDSCHs scheduled based on a predetermined order (e.g. the order of DL subframes). For example, when DL subframes #1, #2 and #3 correspond to one UL subframe and DL subframes #1 and #3 are scheduled, DAI-counter values in PDCCHs corresponding to DL subframes #1 and #3 can be signaled as an initial value and 'initial value 1', respectively. The DAI initial value may be 0 or 1. Considering a 2-bit DAI-counter, modulo-4 operation can be applied to DAI-counter values greater than 4. A DAI may be assigned to each DL CC (DL cell).

Figure 18:
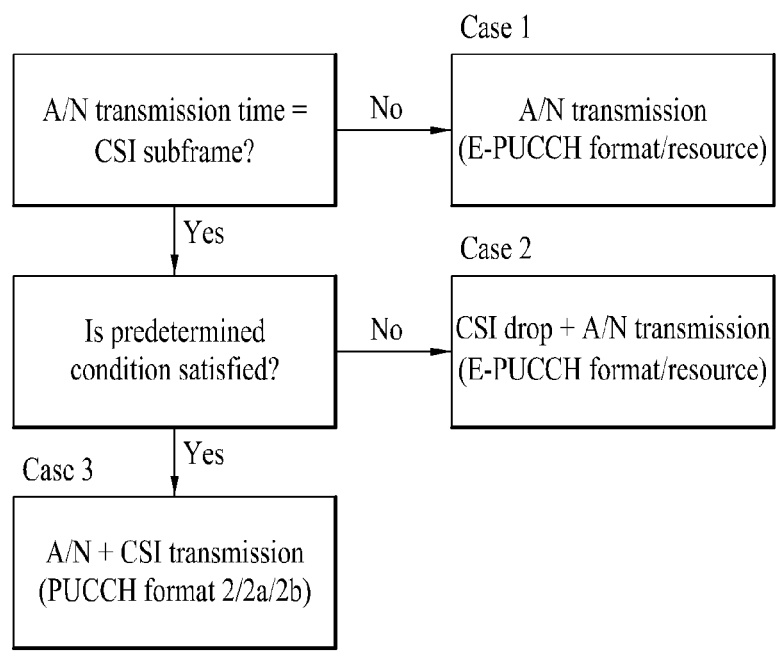
FIG. 18 illustrates a UCI transmission scheme according to another embodiment of the present invention.

FIG. 18 illustrates an exemplary UCI transmission scheme according to an embodiment of the present invention. It is assumed that the UE is configured to use the multi-bit UCI coding scheme (i.e. E-PUCCH format (PUCCH format 3)). FIG. 18 illustrates a PUCCH resource allocation procedure focused on ACK/NACK and CSI. The following three cases can be considered for transmission of ACK/NACK and CSI.

Case 1: ACK/NACK is transmitted in a non-CSI subframe.
Case 2: ACK/NACK is transmitted in a CSI subframe, and a predetermined condition is not satisfied.
Case 3: ACK/NACK is transmitted in a CSI subframe, and a predetermined condition is satisfied.

Referring to FIG. 18, ACK/NACK is transmitted using the multi-bit UCI coding scheme in case 1. Specifically, ACK/NACK is transmitted using the E-PUCCH format/resource described with reference to FIGS. 13 and 14. A HARQ-ACK PUCCH resource for the E-PUCCH format may be explicitly allocated using ARI. As shown in Table 4, the HARQ-ACK PUCCH resource for the E-PUCCH format may be indicated by values of TPC (Transmit Power Control) fields of one or more SCC PDCCHs.

Cases 2 and 3 correspond to a case in which ACK/NACK needs to be transmitted in a CSI subframe. Case 2 corresponds to a case in which a predetermined condition is not satisfied whereas case 3 corresponds to a case in which the predetermined condition is satisfied. For example, the predetermined condition includes at least one of the following conditions (1) to (3). Specifically, the predetermined condition includes at least one of the following conditions (1) to (3) for subframe n−k when the CSI transmission time corresponds to subframe n.

(1) a single PDSCH transmission only on a PCell indicated by detection of a PDCCH having a DAI initial value is present. The DAI initial value is 0 or 1.
(2) a single PDCCH transmission only on the PCell that has the DAI initial value and indicates an SPS release is present. The DAI initial value is 0 or 1.
(3) a single PDSCH transmission only on the PCell where there is not a corresponding PDCCH is present.

When the predetermined condition is not satisfied (case 2), the UE drops CSI and transmits ACK/NACK only. In this case, the ACK/NACK can be transmitted using the E-PUCCH format/resource. When the predetermined condition is satisfied (case 3), the UE transmits both the ACK/NACK and CSI using a single PUCCH. Specifically, the ACK/NACK can be embedded in a PUCCH format for CSI transmission and transmitted. More specifically, the ACK/NACK can be loaded in the RS symbol (e.g. RS modulation) of PUCCH format 2/2a/2b for CSI transmission (refer to FIG. 7) or in a payload (e.g. joint coding) (refer to FIG. 8) and transmitted.

In TDD scheme 1/2, it is possible to independently signal whether or not simultaneous transmission of CSI and A/N and simultaneous transmission of SRS and A/N are permitted. Particularly, when simultaneous transmission of SRS and A/N is permitted, a plurality of specific UL subframes configured to use the shortened PUCCH format for A/N transmission may be present. The shortened PUCCH format means a PUCCH format that transmits a UL signal using only symbols other than an SC-FDMA (or OFDM) symbol capable of transmitting the SRS in a subframe in which a corresponding PUCCH is transmitted. For reference, a normal PUCCH format means a PUCCH format that performs UL signal transmission using up to SC-FDMA (or OFDM) symbols (e.g. the last symbol of a subframe) capable of transmitting the SRS in a subframe.

When CSI, ACK/NACK and SRS need to be transmitted at the same time (i.e. in collided subframes) while simultaneous transmission of the CSI and ACK/NACK is permitted in a CC aggregation based TDD system, the following UE operations can be considered on the basis of TDD scheme 1/2 according to whether or not simultaneous transmission of SRS and ACK/NACK is permitted.

When simultaneous transmission of SRS and A/N is permitted

In case of using the shortened PUCCH format in collided subframes

Case in which application of TDD scheme 1 is considered

Case #1) one or more PDSCHs are received only for PCC: It is possible to drop the SRS and simultaneously transmit the CSI and A/N in PUCCH format 2/2a/2b using TDD scheme 1.

Case #2) All cases other than case #1: It is possible to drop the CSI and simultaneously transmit the SRS and A/N using the shortened PUCCH format. Considering UCI priority defined in LTE, SRS drop can be considered because the CSI has a higher priority than the SRS. However, in cases other than case #1, it is advantageous to transmit the SRS because the CSI is dropped according to collision of the CSI and A/N.

Case in which application of TDD scheme 2 is considered

Case #1) only one PDSCH (when SPS PDSCH is not present) corresponding to a DAT initial value or only one SPS PDSCH (when SPS PDSCH is present) is received only for PCC: It is possible to drop the SRS and simultaneously transmit the CSI and A/N in PUCCH format 2/2a/2b using TDD scheme 2.

Case #2) All cases other than case #1: It is possible to drop the CSI and simultaneously transmit the SRS and A/N using a shortened PUCCH format.

In case that the shortened PUCCH format is not used in collided subframes

Case in which application of TDD scheme 1 is considered

Case #1) one or more PDSCHs are received only for PCC: It is possible to drop the SRS and simultaneously transmit the CSI and A/N in PUCCH format 2/2a/2b using TDD scheme 1.

Case #2) All cases other than case #1: It is possible to drop the CSI and SRS, and transmit A/N using a normal PUCCH format, Case in which application of TDD scheme 2 is considered Case #1) only one PDSCH (when SPS PDSCH is not present) corresponding to a DAT initial value or only one SPS PDSCH (when SPS PDSCH is present) is received only for PCC: It is possible to drop the SRS and simultaneously transmit the CSI and A/N in PUCCH format 2/2a/2b using TDD scheme 2.

Case #2) All cases other than case #1: It is possible to drop the CSI and SRS, and transmit A/N using a normal PUCCH format.

When simultaneous transmission of SRS and A/N is not permitted

Case in which application of TDD scheme 1 is considered

Case #1) one or more PDSCHs are received only for PCC: It is possible to drop the SRS, and simultaneously transmit the CSI and A/N in PUCCH format 2/2a/2b using TDD scheme 1.

Case #2) All cases other than case #1: It is possible to drop the CSI and SRS, and transmit A/N using a normal PUCCH format.

Case in which application of TDD scheme 2 is considered

Case #1) only one PDSCH (when SPS PDSCH is not present) corresponding to a DAI initial value or only one SPS PDSCH (when SPS PDSCH is present) is received only for PCC: It is possible to drop the SRS, and simultaneously transmit the CSI and A/N in PUCCH format 2/2a/2b using TDD scheme 2.

Case #2) All cases other than case #1: It is possible to drop the CSI and SRS, and transmit A/N using a normal PUCCH format.

In case of CC aggregation based TDD, the following UE operations can be considered when simultaneous transmission of CSI and A/N is required according to a combination of permission (referred to as "PUCCH+PUSCH ON" for convenience)/non-permission (referred to as "PUCCH+PUSCH OFF" for convenience) of simultaneous transmission of PUCCH/PUSCH and permission (referred to as "CSI+A/N ON" for convenience)/nonpermission (referred to as "CSI+A/N OFF" for convenience) of simultaneous transmission of CSI+A/N over a PUCCH on the basis of the proposed schemes.

In case of PUCCH+PUSCH OFF and CSI+A/N OFF

When there is no PUSCH transmission

It is possible to drop CST and transmit A/N through a PUCCH.

When there is a PUSCH transmission

It is possible to piggy back the CSI and A/N on the PUSCH to transmit the CSI and A/N. In this case, no PUCCH is transmitted.

In case of PUCCH+PUSCH OFF and CSI+A/N ON

When there is no PUSCH transmission

Case in which application of TDD scheme 1 is considered

Case #1) one or more PDSCHs are received only for PCC: It is possible to simultaneously transmit the CSI and A/N through a PUCCH using TDD scheme 1.

Case #2) All cases other than case #1: It is possible to drop the CSI, and transmit A/N through a PUCCH.

Case in which application of TDD scheme 2 is considered

Case #1) only one PDSCH (when SPS PDSCH is not present) corresponding to a DAI initial value or only one SPS PDSCH (when SPS PDSCH is present) is received only for PCC: It is possible to simultaneously transmit the CSI and A/N through a PUCCH using TDD scheme 2.

Case #2) All cases other than case #1; It is possible to drop the CSI, and transmit A/N over a PUCCH.

When there is a PUSCH transmission

It is possible to piggy back the CSI and A/N on the PUSCH to transmit the CSI and A/N. In this case, no PUCCH is transmitted.

In case of PUCCH+PUSCH ON and CSI+A/N OFF

When there is no PUSCH transmission

It is possible to drop the CSI, and transmit A/N through the PUCCH.

When there is a PUSCH transmission

It is possible to piggy back the CSI on the PUSCH and transmit A/N through the PUCCH.

In case of PUCCH+PUSCH ON and CSI+A/N ON
When there is no PUSCH transmission
  Case in which application of TDD scheme 1 is considered
    Case #1) one or more PDSCHs are received only for PCC: It is possible to simultaneously transmit the CSI and A/N through a PUCCH using TDD scheme 1.
    Case #2) All cases other than case #1: It is possible to drop the CSI, and transmit A/N through a PUCCH.
  Case in which application of TDD scheme 2 is considered
    Case #1) only one PDSCH (when SPS PDSCH is not present) corresponding to a DAI initial value or only one SPS PDSCH (when SPS PDSCH is present) is received only for PCC: It is possible to simultaneously transmit the CSI and A/N through a PUCCH using TDD scheme 2.
    Case #2) All cases other than case #1: It is possible to drop the CSI, and transmit A/N over the PUCCH.
When there is a PUSCH transmission
  Case in which application of TDD scheme 1 is considered
    Case #1) one or more PDSCHs are received only for PCC: It is possible to simultaneously transmit the CSI and A/N through a PUCCH using TDD scheme 1.
    Case #2) All cases other than case #1: It is possible to piggy back the CSI on the PUSCH and transmit A/N through the PUCCH.
  Case in which application of TDD scheme 2 is considered
    Case #1) only one PDSCH (when SPS PDSCH is not present) corresponding to a DAI initial value or only one SPS PDSCH (when SPS PDSCH is present) is received only for PCC: It is possible to simultaneously transmit the CSI and A/N through a PUCCH using TDD scheme 2.
    Case #2) All cases other than case #1: It is possible to piggy back the CSI on the PUSCH transmit A/N over the PUCCH.

The above-described scheme may be combined with a scheme of embedding an SR in PUCCH format 2 for CSI transmission. Specifically, the scheme of embedding ACK/NACK in PUCCH format 2 may be used when an SR transmission time and a CSI transmission time do not collide whereas the scheme of embedding the SR in PUCCH format 2 may be used when the SR transmission time and CSI transmission time collide. Preferably, the scheme of embedding the SR in PUCCH format 2 can be applied only when ACK/NACK information is not present at the corresponding time (time when SR transmission and SCI transmission overlap).

Alternatively, when the CSI transmission time (that is, CSI subframe) and ACK/NACK transmission time collide, it is possible to joint-code CSI and ACK/NACK in the CSI subframe and then to transmit the joint-coded CSI and ACK/NACK through a payload of an arbitrary PUCCH resource (e.g. PUCCH format 2 (preferably, when ACK/NACK transmission is performed using the ACK/NACK channel selection scheme) or through a payload of PUCCH format 3 (preferably, when ACK/NACK transmission is performed using the multi-bit ACK/NACK coding scheme)). In this case, the ACK/NACK is CW-bundled when the CSI and ACK/NACK are joint-coded in the CSI subframe in order to prevent the PUCCH payload from abruptly increasing in the CSI subframe. Here, CW bundling is a scheme of transmitting 1-bit ACK/NACK information bundled for a PDSCH of a CC configured with the MIMO transmission mode (e.g. when a plurality of CWs are transmitted through a PDSCH, ACK is signaled only when all the CWs of the PDSCH correspond to ACK, and NACK is signaled in other cases).

The above-mentioned scheme (i.e. joint coding in the CSI subframe) is applicable both an FDD system and a TDD system. Application of CW bundling in the CSI subframe may be US-specifically signaled through L1/L2/RRC signaling.

Figure 19:
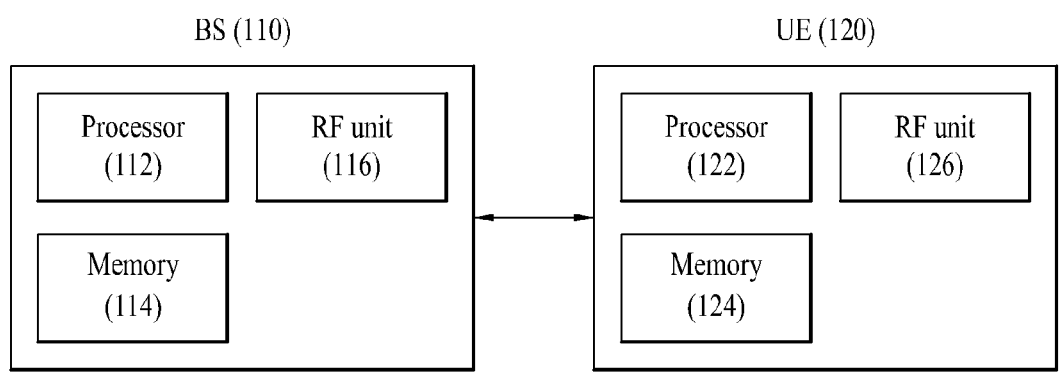
FIG. 19 illustrates a base station (BS) and a UE to which embodiments of the present invention can be applied.

FIG. 19 is a block diagram of a BS and a UE which can be applied to the embodiments of the present invention. When a relay is included in a wireless communication system, communication is performed between the BS and the relay on a backhaul link and communication is established between the relay and the UE on an access link. Accordingly, the BS and the UE shown in FIG. 22 can be replaced by a relay as necessary.

Referring to FIG. 19, a wireless communication system includes a BS 110 and a UE 120. The BS 110 includes a processor 112, a memory 114, and an RF unit 116. The processor 112 may be configured so as to implement the procedures and/or methods of the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods of the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'US' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for transmitting uplink control information at a communication apparatus in a time division duplex (TDD) wireless communication system, the method comprising:
receiving at least one physical downlink control channel (PDCCH) or at least one physical downlink shared channel (PDSCH); and
generating reception response information about the at least one PDCCH or the at least one PDSCH,
wherein when the reception response information and channel status information are configured to be transmitted in a same subframe, if a certain condition is satisfied, the reception response information and the channel status information are transmitted together using a first physical uplink control channel (PUCCH) format,
wherein the certain condition includes a first condition of a single PDSCH transmission only on a primary cell (PCell) indicated by detection of a PDCCH having a downlink assignment index (DAI) initial value being present, and
wherein the DAI initial value is 1.

2. The method of claim 1, wherein the certain condition includes at least one of the first condition or a second condition of a single PDCCH transmission only on the PCell that has the DAI initial value and indicates a semi-persistent scheduling (SPS) release being present.

3. The method of claim 2, wherein the certain condition includes at least one of the first condition, the second condition or a third condition of a single PDSCH transmission only on the PCell where there is not a corresponding PDCCH being present.

4. The method of claim 3, wherein when the reception response information and the channel status information are configured to be transmitted in the same subframe, if the certain condition is not satisfied, the reception response information is transmitted using a second PUCCH format and the channel status information is dropped.

5. The method of claim 4, wherein the second PUCCH format is a PUCCH format 3, and
wherein the PUCCH format 3 is a block-spreading based PUCCH format using Orthogonal Cover Code (OCC) based time-domain spreading.

6. The method of claim 3, wherein if the certain condition is not satisfied, a resource for the second PUCCH format is indicated by a value of transmit power control (TPC) field of one or more secondary cell (SCell) PDCCH or one or more PCell PDCCH not corresponding to the DAI initial value.

7. The method of claim 1, wherein the at least one PDCCH or the at least one PDSCH is received in a subframe, or in subframes, n−k (k∈K), the reception response information is transmitted in a subframe n, and K is given by the below table in accordance with an uplink-downlink (UL-DL) configuration:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

8. The method of claim 2, wherein the first PUCCH format is a PUCCH format 2, 2a or 2b,
wherein the PUCCH format 2 includes the channel status information when not multiplexed with Hybrid Automatic Repeat and reQuest ACKnowledgment (HARQ-ACK) information or includes the channel status information with the HARQ-ACK information in case of an extended Cyclic Prefix (CP),
wherein the PUCCH format 2a includes the channel status information with 1-bit HARQ-ACK information in case of a normal CP, and
wherein the PUCCH format 2b includes the channel status information with 2-bit HARQ-ACK information in case of the normal CP.

9. A communication apparatus configured to transmit uplink control information in a time division duplex (TDD) wireless communication system, the communication apparatus comprising:
a radio frequency (RF) unit; and
a processor configured to receive at least one physical downlink control channel (PDCCH) or at least one physical downlink shared channel (PDSCH), and to generate reception response information about the at least one PDCCH or the at least one PDSCH,
wherein when the reception response information and channel status information are configured to be transmitted in a same subframe, if a certain condition is satisfied, the reception response information and the channel status information are transmitted together using a first physical uplink control channel (PUCCH) format, wherein the certain condition includes a first condition of a single PDSCH transmission only on a primary cell (PCell) indicated by detection of a PDCCH having a downlink assignment index (DAI) initial value being present, and wherein the DAI initial value is 1.

10. The communication apparatus of claim 9, wherein the certain condition includes at least one of the first condition or a second condition of a single PDCCH transmission only on the PCell that has the DAI initial value and indicates a Semi-Persistent Scheduling (SPS) release being present.

11. The communication apparatus of claim 10, wherein the certain condition includes at least one of the first condition, the second condition or a third condition of a single PDSCH transmission only on the PCell where there is not a corresponding PDCCH being present.

12. The communication apparatus of claim 11, wherein when the reception response information and the channel status information are configured to be transmitted in the same subframe, if the certain condition is not satisfied, the reception response information is transmitted using a second PUCCH format and the channel status information is dropped.

13. The communication apparatus of claim 11, wherein if the certain condition is not satisfied, a resource for the second PUCCH format is indicated by a value of transmit power control (TPC) field of one or more secondary cell (SCell) PDCCH or one or more PCell PDCCH not corresponding to the DAI initial value.

14. The communication apparatus of claim 11, wherein the second PUCCH format is a PUCCH format 3, and wherein the PUCCH format 3 is a block-spreading based PUCCH format using Orthogonal Cover Code (OCC) based time-domain spreading.

15. The communication apparatus of claim 9, wherein the at least one PDCCH or the at least one PDSCH is received in a subframe, or in subframes, n–k (k∈K), the reception response information is transmitted in a subframe n, and K is given by the below table in accordance with an uplink-downlink (UL-DL) configuration:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

6. The communication apparatus of claim 9, wherein the first PUCCH format is a PUCCH format 2, 2a or 2b, wherein the PUCCH format 2 includes the channel status information when not multiplexed with Hybrid Automatic Repeat and reQuest ACKnowledgment (HARQ-ACK) information or includes the channel status information with the HARQ-ACK information in case of an extended Cyclic Prefix (CP), wherein the PUCCH format 2a includes the channel status information with 1-bit HARQ-ACK information in case of a normal CP, and wherein the PUCCH format 2b includes the channel status information with 2-bit HARQ-ACK information in case of the normal CP.

* * * * *